US010742828B2

(12) United States Patent
Ogawa

(10) Patent No.: US 10,742,828 B2
(45) Date of Patent: Aug. 11, 2020

(54) PRINTING APPARATUS, CONTROL METHOD AND STORAGE MEDIUM

(71) Applicant: CANON KABUSHIKI KAISHA, Tokyo (JP)

(72) Inventor: Katsuya Ogawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/366,711

(22) Filed: Mar. 27, 2019

(65) Prior Publication Data

US 2019/0306358 A1 Oct. 3, 2019

(30) Foreign Application Priority Data

Mar. 30, 2018 (JP) .................................. 2018-067033

(51) Int. Cl.
H04N 1/00 (2006.01)
G06K 15/10 (2006.01)
B41J 2/155 (2006.01)
G06F 3/12 (2006.01)

(52) U.S. Cl.
CPC .......... *H04N 1/00779* (2013.01); *B41J 2/155* (2013.01); *G06F 3/1242* (2013.01); *G06K 15/102* (2013.01); *H04N 1/00785* (2013.01)

(58) Field of Classification Search
CPC .......... H04N 1/00779; H04N 1/00785; G06K 15/102; B41J 2/155; G06F 3/1242
USPC ........................................................ 358/1.18
See application file for complete search history.

(56) References Cited

U.S. PATENT DOCUMENTS

| 2007/0013732 A1* | 1/2007 | Sakamoto | B41J 2/2135 347/20 |
| 2008/0150987 A1* | 6/2008 | Yamanobe | B41J 2/2125 347/12 |
| 2013/0241997 A1* | 9/2013 | Teshigawara | G03G 15/104 347/41 |

FOREIGN PATENT DOCUMENTS

JP    2017-132175 A    8/2017

\* cited by examiner

*Primary Examiner* — Saeid Ebrahimi Dehkordy
(74) *Attorney, Agent, or Firm* — Venable LLP

(57) ABSTRACT

An object is to keep continuity of data in a case where print data for which inclination correction processing has been performed is transferred sequentially. The present invention is a printing apparatus including: a print head in which a plurality of nozzle rows is arrayed, each of the nozzle rows having an inclination with respect to a direction intersecting with a conveyance direction of a printing medium; a creation unit configured to create a plurality of pieces of divided data by dividing image data corresponding to an entire printing-target image area in the conveyance direction; and an image processing unit configured to create print data corresponding to the divided data by performing image processing including inclination correction in accordance with an inclination of the nozzle row for the divided data, and the creation unit divides the image data so that areas necessary for the inclination correction overlap.

19 Claims, 21 Drawing Sheets

PRINTING APPARATUS, CONTROL METHOD AND STORAGE MEDIUM

BACKGROUND OF THE INVENTION

Field of the Invention

The present invention relates to a printing apparatus, a control method, and a storage medium.

Description of the Related Art

The demand for the ink jet printing apparatus is increasing in the wide industrial field as a printing apparatus that is comparatively simple and excellent and an increase in the printing speed and an improvement in the print quality are requested. As an ink jet printing apparatus that responds to the request for an increase in the printing speed, there is one including a line head in which nozzle rows are arranged perpendicular to the conveyance direction of a printing medium, such as a sheet, and which has the same length as the width of the printing medium.

As the control method of a buffer storing print data in the ink jet printing apparatus including the line head, the method described in Japanese Patent Laid-Open 2017-132175 is known. Specifically, within a plurality of head controllers controlling a plurality of print heads, a plurality of small buffers corresponding to each nozzle row of the print head and each including a read pointer is included. The head controller sends a transfer request of image data to a high-order controller while managing the position of each read pointer.

According to this method, the head controller starts ejection control of ink and sequentially sends a transfer request to the high-order controller while performing ejection control before all print data is obtained, and therefore, it is possible for the high-order controller to efficiently transfer image data to the head controller.

SUMMARY OF THE INVENTION

In the ink jet printing apparatus including the line head, in order to increase the nozzle density in the direction perpendicular to the conveyance direction of a printing medium, there is a case where the nozzle row is provided obliquely with respect to the perpendicular direction. As a method in which the ink jet printing apparatus forms an image in accordance with the inclination of the nozzle row, it is considered to store print data for which inclination correction processing has been performed in a buffer and for the head controller to read print data similarly as in a case where there is no inclination of the nozzle row.

As in Japanese Patent Laid-Open No. 2017-132175, a method is considered in which data for which the inclination correction processing described previously has been performed is stored in a buffer in a case where divided print data is transferred sequentially in response to a transfer request of the head controller.

In Japanese Patent Laid-Open No. 2017-132175, print data divided in the conveyance direction is transferred sequentially, but in a case where print data for which the inclination correction processing has been performed is transferred sequentially and stored in a storage area, the end portions of the print data do not coincide with each other on the storage area and the data becomes discontinuous data.

Consequently, in view of the above-described problem, an object of the present invention is to keep continuity of data in a case where print data for which inclination correction processing has been performed is transferred sequentially and stored in a storage area.

The present invention is a printing apparatus including: a print head in which a plurality of nozzle rows including a plurality of nozzles ejecting ink is arrayed, each of the nozzle rows having an inclination with respect to a direction intersecting with a conveyance direction of a printing medium; a creation unit configured to create a plurality of pieces of divided data by dividing image data corresponding to an entire printing-target image area in the conveyance direction; an image processing unit configured to create print data corresponding to the divided data by performing image processing including inclination correction in accordance with an inclination of the nozzle row for the divided data; and a storage control unit configured to store the print data in a storage area, and the creation unit divides the image data so that areas necessary for the inclination correction overlap.

Further features of the present invention will become apparent from the following description of exemplary embodiments with reference to the attached drawings.

DESCRIPTION OF THE EMBODIMENTS

First Embodiment

In the following, with reference to the drawings, embodiments of the present invention are explained. However, the following embodiments are not intended to limit the present invention and all combinations of features explained in the present embodiments are not necessarily indispensable to the solution of the present invention.

Figure 1:
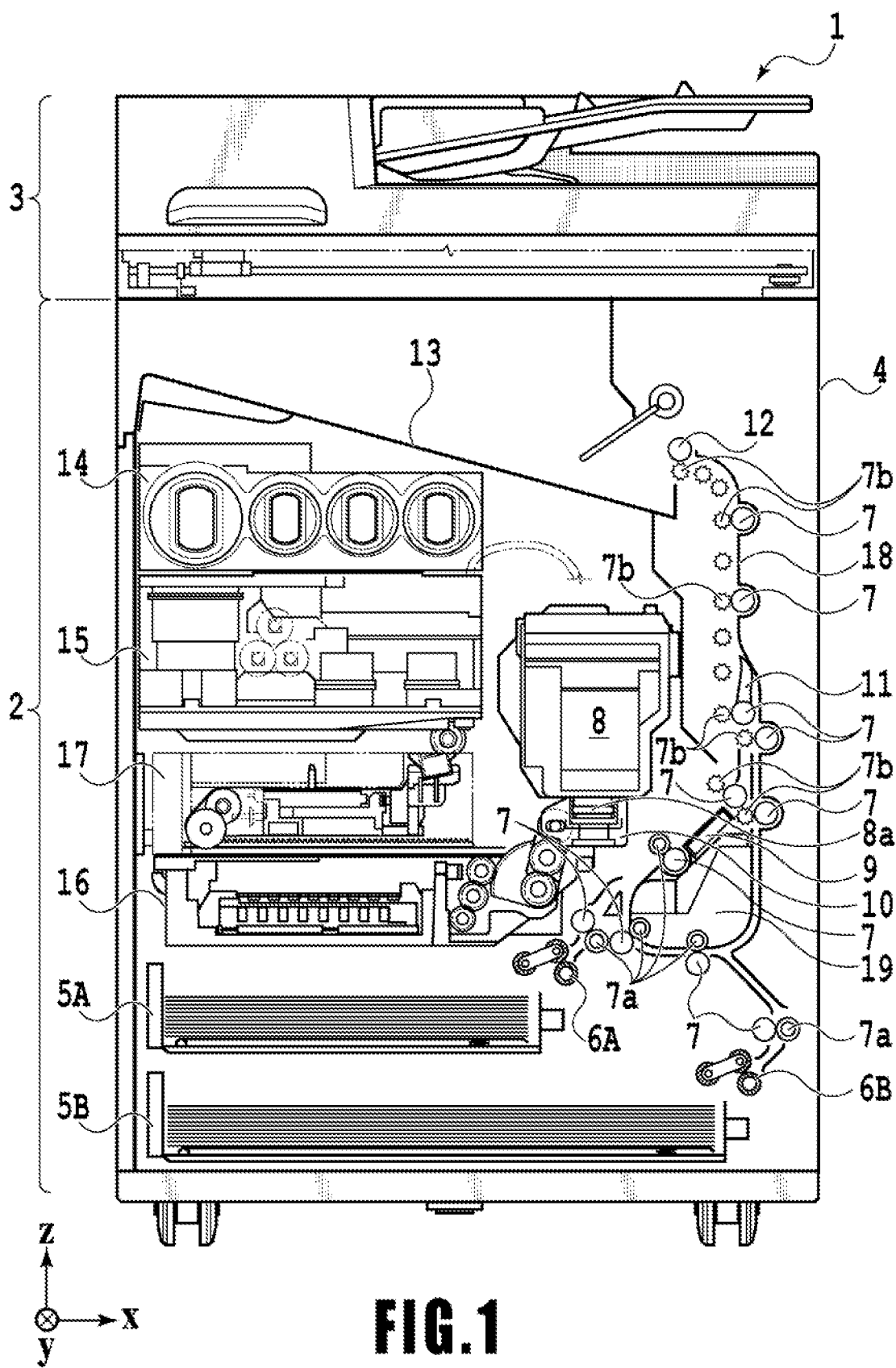
FIG. 1 is an internal configuration diagram of a printing apparatus.

FIG. 1 is an internal configuration diagram of an ink jet printing apparatus 1 (hereinafter, printing apparatus 1) according to the present embodiment. In FIG. 1, the x-direction indicates the horizontal direction, the y-direction (direction perpendicular to the paper surface) indicates the depth direction, and the z-direction indicates the vertical direction, respectively.

The printing apparatus 1 is a multi function printer including a print unit 2 and a scanner unit 3 and capable of performing a variety of kinds of processing relating to the printing operation and the reading operation by the print unit 2 and the scanner unit 3 individually, or in an interlocking manner of the print unit 2 and the scanner unit 3. The scanner unit 3 includes an ADF (Auto Document Feeder) and an FBS (Flat Bed Scanner) and is capable of reading a document automatically fed by the ADF and reading (scanning) a document placed on a document table of the FBS by a user. Here, the multi function printer having both the print unit 2 and the scanner unit 3 is described, but an aspect may be accepted in which the scanner unit 3 is not included. FIG. 1 shows a case where the printing apparatus 1 is in a standby state where the printing apparatus 1 is performing neither the printing operation nor the reading operation.

In the print unit 2, at the bottom in the vertically downward direction of a casing 4, a first cassette 5A and a second cassette 5B for storing a printing medium (cut sheet) S are installed in an attachable and detachable manner. In the first cassette 5A, comparatively small printing media up to the A4 size, and in the second cassette 5B, comparatively large printing media up to the A3 size are stored in a piled-up manner. In the vicinity of the first cassette 5A, a first feed unit 6A for feeding stored printing media by separating one by one is provided. Similarly, in the vicinity of the second cassette 5B, a second feed unit 6B is provided. In a case where the printing operation is performed, the printing medium S is selectively fed from one of the cassettes.

A conveyance roller 7, a discharge roller 12, a pinch roller 7a, a spur 7b, a guide 18, an inner guide 19, and a flapper 11 are conveyance mechanisms for guiding the printing medium S in a predetermined direction. The conveyance roller 7 is arranged on the upstream side and on the downstream side of a print head 8 and is a drive roller that is driven by a conveyance motor, not shown schematically. The pinch roller 7a is a follower roller that nips and rotates the printing medium S together with the conveyance roller 7. The discharge roller 12 is arranged on the downstream side of the conveyance roller 7 and is a drive roller that is driven by a conveyance motor, not shown schematically. The spur 7b sandwiches and conveys the printing medium S together with the conveyance roller 7 arranged on the downstream side of the print head 8 and the discharge roller 12.

The guide 18 is provided in the conveyance path of the printing medium S and guides the printing medium S in a predetermined direction. The inner guide 19 is a member extending in the y-direction and has a curved side surface, and guides the printing medium S along the side surface. The flapper 11 is a member for switching directions in which the printing medium S is conveyed at the time of the both-side printing operation. A discharge tray 13 is a tray for loading and holding the printing medium S for which the printing operation has been completed and which is discharged by the discharge roller 12.

The print head 8 is a color ink jet print head of line head type. In the print head 8, ejection ports from which ink is ejected in accordance with print data are arrayed for four colors of Bk (black), C (cyan), M (magenta), and Y (yellow) so as to correspond to the width of the printing medium S along the y-direction in FIG. 1. In a case where the print head 8 is at the standby position, an ejection port surface 8a of the print head 8 is capped by a cap unit 10 as shown in FIG. 1. A platen 9 is configured by a flat plate extending in the y-direction and supports the printing medium S from the rear side, for which the printing operation is performed by the print head 8.

An ink tank unit 14 stores four color inks to be supplied to the print head 8, respectively. An ink supply unit 15 is provided on the way in the flow path connecting the ink tank unit 14 and the print head 8 and adjusts the pressure and the amount of flow of the ink within the print head 8 to an appropriate range. The printing apparatus 1 has a circulation-type ink supply system and the ink supply unit 15 adjusts the pressure of the ink supplied to the print head 8 and the amount of flow of the ink recovered from the print head 8 to an appropriate range.

A maintenance unit 16 includes the cap unit 10 and a wiping unit 17 and performs the maintenance operation for the print head 8 by causing these units to operate at predetermined timing.

Figure 2:
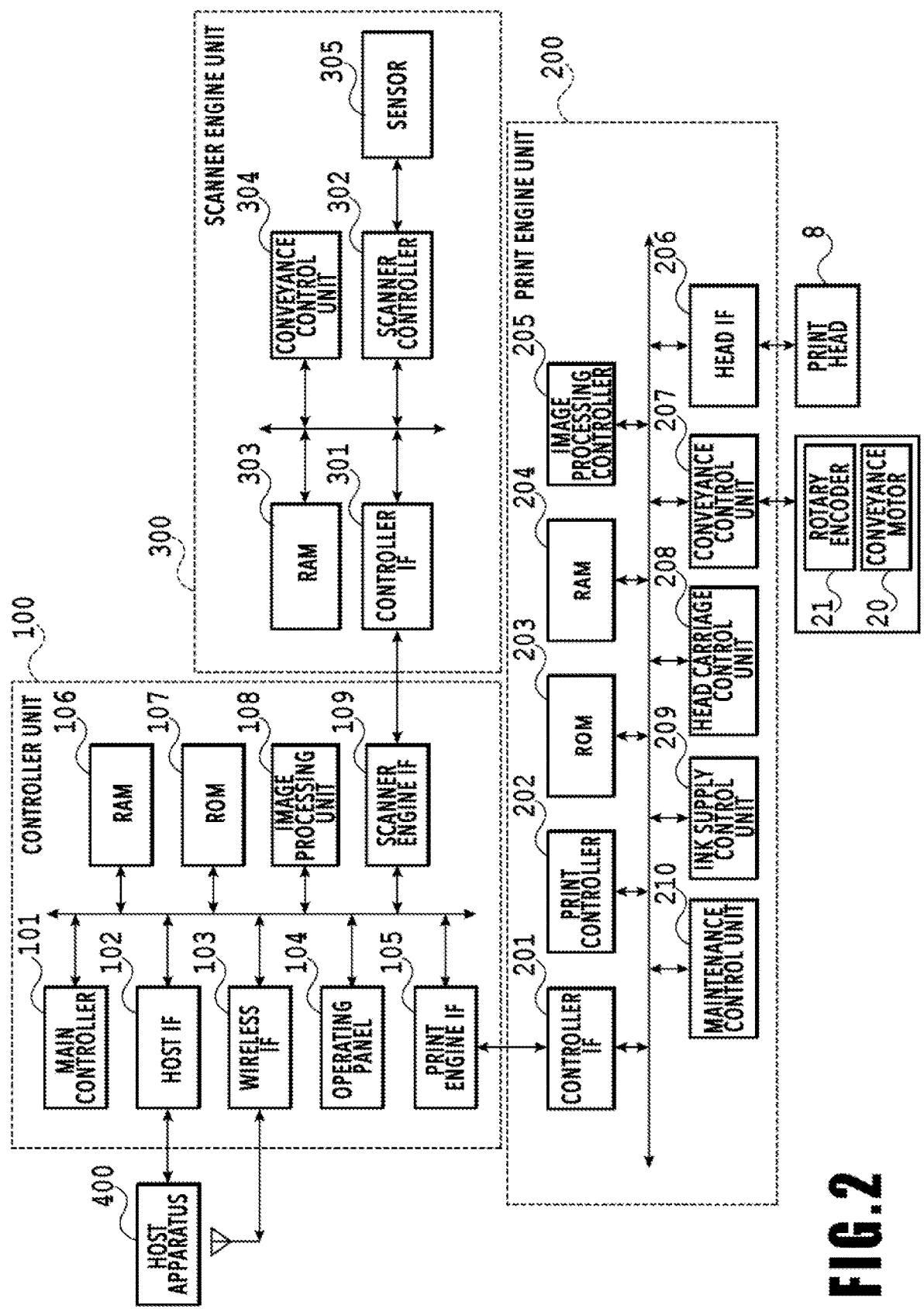
FIG. 2 is a block diagram showing a control configuration of the printing apparatus.

FIG. 2 is a block diagram showing a control configuration in the printing apparatus 1. The printing apparatus 1 mainly includes a print engine unit 200 configured to centralizedly control the print unit 2, a scanner engine unit 300 configured to centralizedly control the scanner unit 3, and a controller unit 100 configured to centralizedly control the entire printing apparatus 1. A print controller 202 controls various mechanisms of the print engine unit 200 in accordance with instructions of a main controller 101 of the controller unit 100. Various mechanisms of the scanner engine unit 300 are controlled by the main controller 101 of the controller unit 100. In the following, details of the control configuration are explained.

In the controller unit 100, the main controller 101 including a CPU controls the entire printing apparatus 1 by using a RAM 106 as a work area in accordance with programs and various parameters stored in a ROM 107. For example, in a case where a print job is input from a host apparatus 400 via a host I/F (interface) 102 or a wireless I/F 103, an image processing unit 108 performs predetermined image processing for received image data in accordance with instructions of the main controller 101. The predetermined image processing that is performed in the image processing unit 108 includes binarization processing to convert multivalued image data into binary image data. Then, the main controller 101 transmits the image data for which image processing has been performed to the print engine unit 200 via a print engine I/F 105. Further, the main controller 101 transmits each command for giving instructions to the print controller 202 to the print engine unit 200 via the print engine I/F 105 separate from the image data.

The printing apparatus 1 may acquire image data from the host apparatus 400 via wireless communication or wired communication or may acquire image data from an external storage device (USB memory and the like) connected to the printing apparatus 1. However, the communication method that is made use of for wireless communication or wired communication is not limited to this. For example, as the communication method that is made use of for wireless communication, it is possible to apply Wi-Fi (Wireless Fidelity) (registered trademark) and Bluetooth (registered trademark). Further, as the communication method that is made use of for wired communication, it is possible to apply USB (Universal Serial Bus) and the like. In addition, for example, in a case where a read command is input from the host apparatus 400, the main controller 101 transmits this command to the scanner unit 3 via a scanner engine I/F 109.

An operation panel 104 is a mechanism for a user to input and output for the printing apparatus 1. It is possible for a user to give instructions as to the operation, such as copying and scanning, to set a printing mode, to recognize information on the printing apparatus 1, and so on via the operation panel 104.

In the print engine unit 200, the print controller 202 including a CPU controls various mechanisms included in the print unit 2 by using a RAM 204 as a work area in accordance with programs and various parameters stored in a ROM 203.

A controller I/F 201 performs transmission and reception of various commands and communication of image data with the print engine I/F 105. In a case where various commands and image data are received via the controller I/F 201, the print controller 202 temporarily stores them in the RAM 204. An image processing controller 205 converts the image data saved in the RAM 204 into print data so that the print head 8 can make use of for the printing operation in accordance with instructions of the print controller 202. After performing the processing to convert image data into print data (conversion processing), the image processing controller 205 further outputs an interrupt signal (image processing completion interrupt signal) indicating that the conversion processing is completed to the print controller 202. The conversion processing from image data into print data which is performed in the image processing controller 205 of the present embodiment is image processing including inclination correction processing and smoothing processing.

In the following, the buffer within the RAM 204, which stores image data (divided data) received from the print controller 202, is defined as a first buffer (divided data storage area). Further, the buffer within the RAM 204, which stores print data converted by the image processing controller 205, is defined as a second buffer (print data storage area).

Then, at the time of performing the printing operation after this, the print controller 202 conveys the printing medium S by driving the feed units 6A and 6B, the conveyance roller 7, the discharge roller 12, and the flapper 11 shown in FIG. 1 via a conveyance control unit 207.

Figure 3:
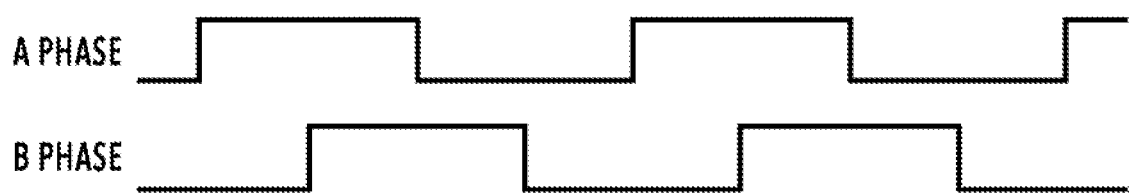
FIG. 3 is a diagram showing an A-phase signal and a B-phase signal output by a rotary encoder.

To the axis of a conveyance motor 20 that drives the conveyance roller 7, a rotary encoder 21 is attached. The rotary encoder 21 is, for example, an optical rotary encoder and provided to detect the conveyance amount of the printing medium S in accordance with the drive amount of the conveyance motor 20. In a case where the conveyance motor 20 rotates a predetermined amount, the rotary encoder 21 outputs a predetermined signal. Specifically, as shown in FIG. 3, the rotary encoder 21 outputs an A-phase signal and a B-phase signal shown in FIG. 3 in accordance with the drive amount (eventually corresponding to the conveyance amount of the printing medium S) of the conveyance motor 20. The B-phase signal is in a phase relationship in which the phase of the B-phase signal is delayed from that of the A-phase signal by 90 degrees and used for determining (checking) the rotation direction of the rotary encoder 21.

Figure 4:
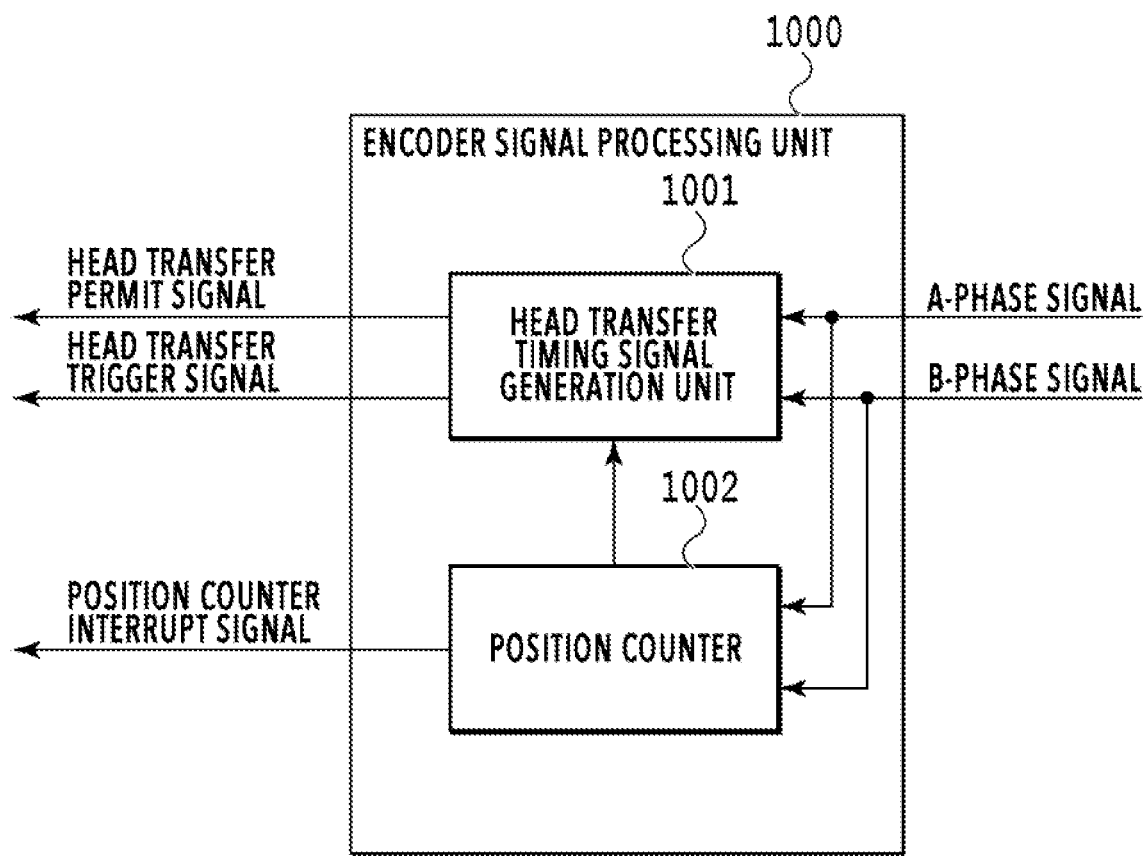
FIG. 4 is a block diagram showing a configuration of an encoder signal processing unit 1000.

The A-phase signal and the B-phase signal output from the rotary encoder are input to an encoder signal processing unit 1000 of the conveyance control unit 207. In more detail, the encoder signal processing unit 1000 includes a head transfer timing signal generation unit 1001 and a position counter 1002 and the A-phase signal and the B-phase signal are input to the head transfer timing signal generation unit 1001 and the position counter 1002, respectively, as shown in FIG. 4.

The position counter 1002 monitors the A-phase signal and increments a position counter value for each rise edge of the A-phase signal. The position counter 1002 includes a register to which a predetermined value can be set by the print controller 202 and in a case where the incremented position counter value becomes equal to a predetermined value set to the register, the position counter 1002 outputs a position counter interrupt signal to the print controller 202. In addition, the position counter 1002 outputs the position counter value to the head transfer timing signal generation unit 1001.

Figure 5:
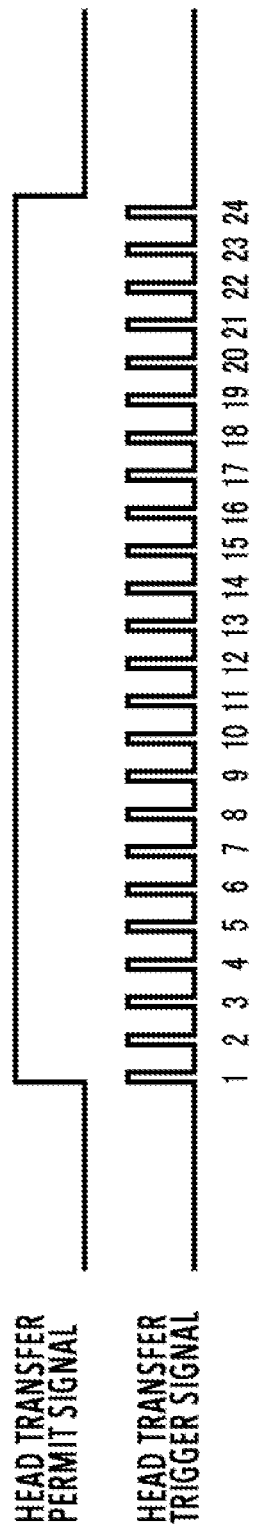
FIG. 5 is a diagram showing a head transfer permit signal and a head transfer trigger signal that a head transfer timing signal generation unit 1001 outputs to a head I/F 206.

The head transfer timing signal generation unit 1001 outputs a head transfer permit signal and a head transfer trigger signal as shown in FIG. 5 to a head I/F 206 based on the input A-phase signal and B-phase signal and the position counter value.

In a case where the head transfer trigger signal becomes the High level (hereinafter, abbreviated to H level) in the state where the head transfer permit signal is at the H level, the head I/F 206 transfers print data corresponding to one line to the print head 8. In FIG. 5, the head transfer trigger signal has become the H level 24 times in the state where the head transfer permit signal is at the H level, and therefore, the print data corresponding to a total of 24 lines has been read from the RAM 204 and transferred to the print head 8.

In the present embodiment, the position counter 1002 increments the position counter value for each rise edge of the A-phase signal, but the timing of increment may be for each fall edge of the A-phase signal. Further, the signal that monitors at the time of increment for each edge may be the B-phase signal. Here, a case is shown where the print engine unit 200 includes the one image processing controller (CPU) 205, the one ROM 203, and the one RAM 204. However, the numbers of image processing controllers (CPUs), ROMs, and RAMs included in the print engine unit 200 are not limited to one, respectively, and may be two or more.

A head carriage control unit 208 changes the orientation and position of the print head 8 in accordance with the operating state, such as the maintenance state and the printing state, of the printing apparatus 1. An ink supply control unit 209 controls the ink supply unit 15 so that the pressure of the ink to be supplied to the print head 8 is adjusted within an appropriate range. A maintenance control unit 210 controls the operation of the cap unit 10 and the wiping unit 17 in the maintenance unit 16 at the time of performing the maintenance operation for the print head 8.

In the scanner engine unit 300, the main controller 101 controls hardware resources of a scanner controller 302 by using the RAM 106 as a work area in accordance with programs and various parameters stored in the ROM 107. Due to this, various mechanisms included in the scanner unit 3 are controlled. For example, by the main controller 101 controlling the hardware resources within the scanner controller 302 via a controller I/F 301, a document mounted on the ADF by a user is conveyed via a conveyance control unit 304 and read by a sensor 305. Then, the scanner controller 302 saves the read image data in a RAM 303. It is possible for the print controller 202 to cause the print head 8 to perform the printing operation based on the image data read by the scanner controller 302 by converting the image data acquired as described above into print data.

Figure 6:
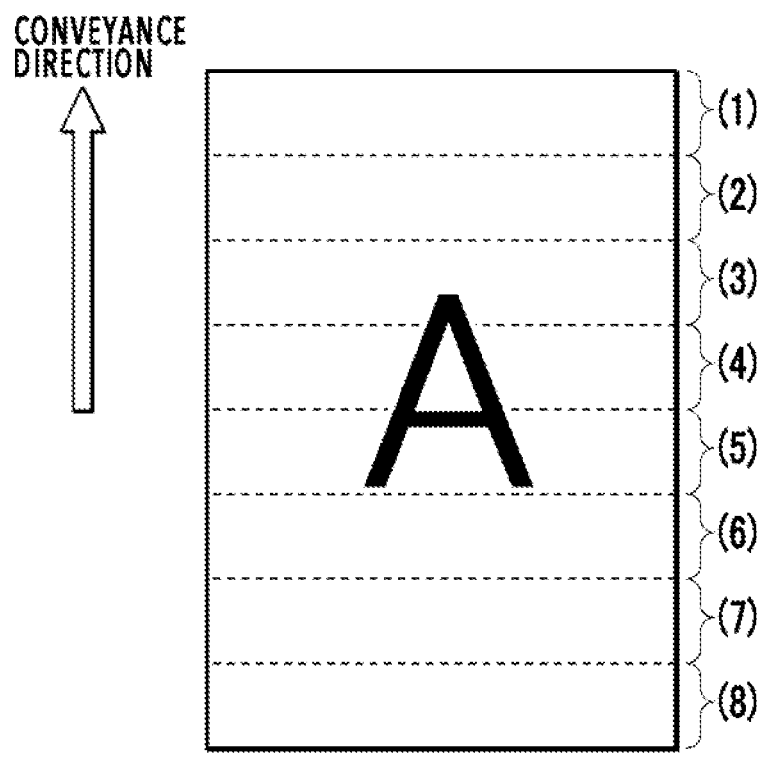
FIG. 6 is a diagram showing an image that is a target of printing processing.

In the following, based on the configuration described previously, the configuration of the buffers (the first buffer that stores image data and the second buffer that stores print data) within the RAM 204 is explained by using FIG. 6 to FIG. 8, and further, the specific processing in the printing apparatus 1 is explained by using FIG. 9 to FIG. 15. FIG. 6 is a diagram showing an image corresponding to one page that is the target of printing processing in the printing apparatus 1. Here, it is assumed that the "image" includes not only the image portion (here, the character portion of "A") that is printed actually but also the area in which an image that is printed is not drawn, but which is the target of printing processing. That is, it is assumed that the "image" indicates the printing-target area corresponding to one page. In FIG. 6, printing of the image is planned and in accordance with the printing order of the image (that is, the conveyance direction of the printing medium), the image is equally divided into eight areas, that is, an area (1) to an area (8) in the order from the upstream side in the conveyance direction.

Figure 7:
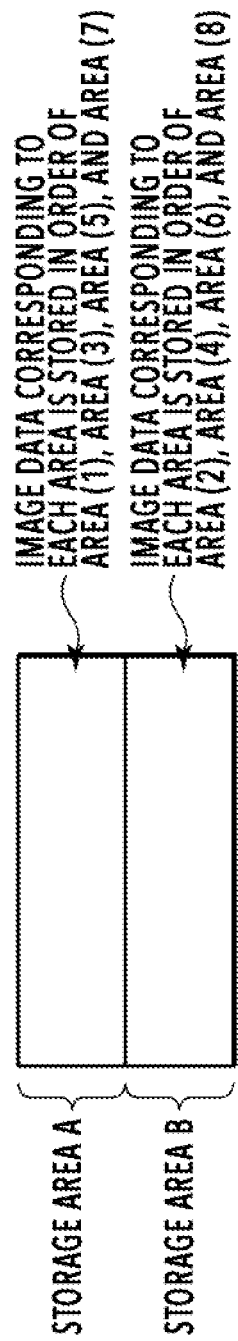
FIG. 7 is a diagram showing a configuration of a first buffer.

FIG. 7 is a diagram showing the configuration of the first buffer that stores image data received from the controller unit 100. The first buffer is configured within the RAM 204 as described previously. As shown in FIG. 7, the first buffer includes two storage areas storing image data corresponding to one of the eight images obtained by equally dividing the printing-target image. Hereinafter, one of the two storage areas is referred to as a storage area A and the other storage area is referred to as a storage area B. Further, in the printing apparatus 1, in the process of performing image processing, each piece of image data corresponding to the areas (1), (3), (5), and (7) of the areas shown in FIG. 6 is temporarily stored in the storage area A and each piece of image data corresponding to the areas (2), (4), (6), and (8) is temporarily stored in the storage area B. The control method of the first buffer will be described later by using FIG. 11 and FIG. 13.

Figure 8:
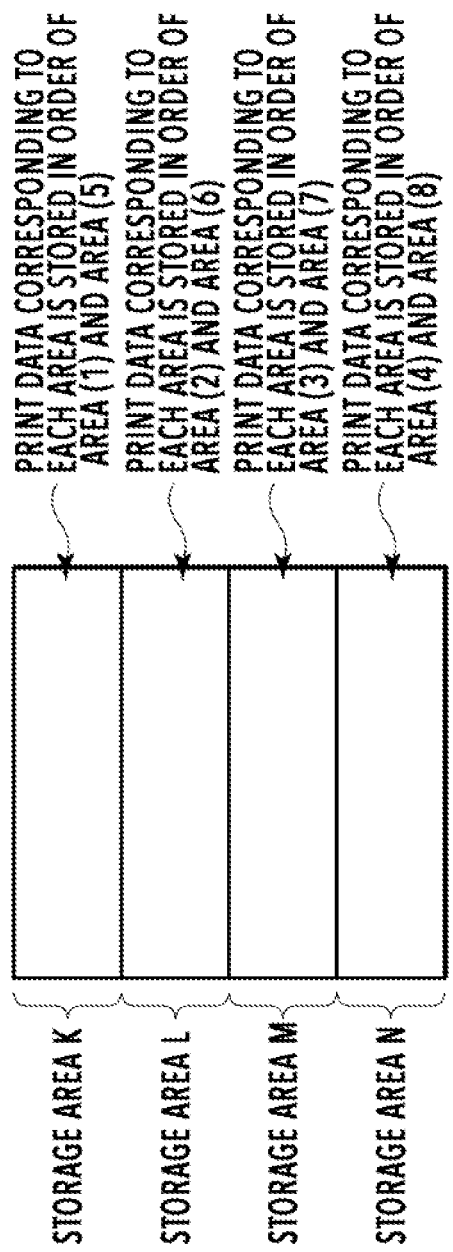
FIG. 8 is a diagram showing a configuration of a second buffer.

FIG. 8 is a diagram showing the configuration of the second buffer that stores the print data converted by the image processing controller 205. The second buffer is configured within the RAM 204 as described above.

As shown in FIG. 8, the second buffer includes four storage areas storing print data corresponding to one of the eight images obtained by equally dividing the printing-target image. Hereinafter, a first storage area of the four storage areas is referred to as a storage area K, a second storage area is referred to as a storage area L, a third storage area is referred to as a storage area M, and a fourth storage area is referred to as a storage area N. Further, in the printing apparatus 1, in the process of creating print data, each piece of print data corresponding to the areas (1) and (5) of the areas shown in FIG. 6 is stored temporarily in the storage area K. Similarly, each piece of print data corresponding to the areas (2) and (6) is stored temporarily in the storage area L, each piece of print data corresponding to the areas (3) and (7) is stored temporarily in the storage area M, and each piece of print data corresponding to the areas (4) and (8) is stored temporarily in the storage area N. The control method of the second buffer will be described later by using FIG. 12 and FIG. 14.

Figure 9:
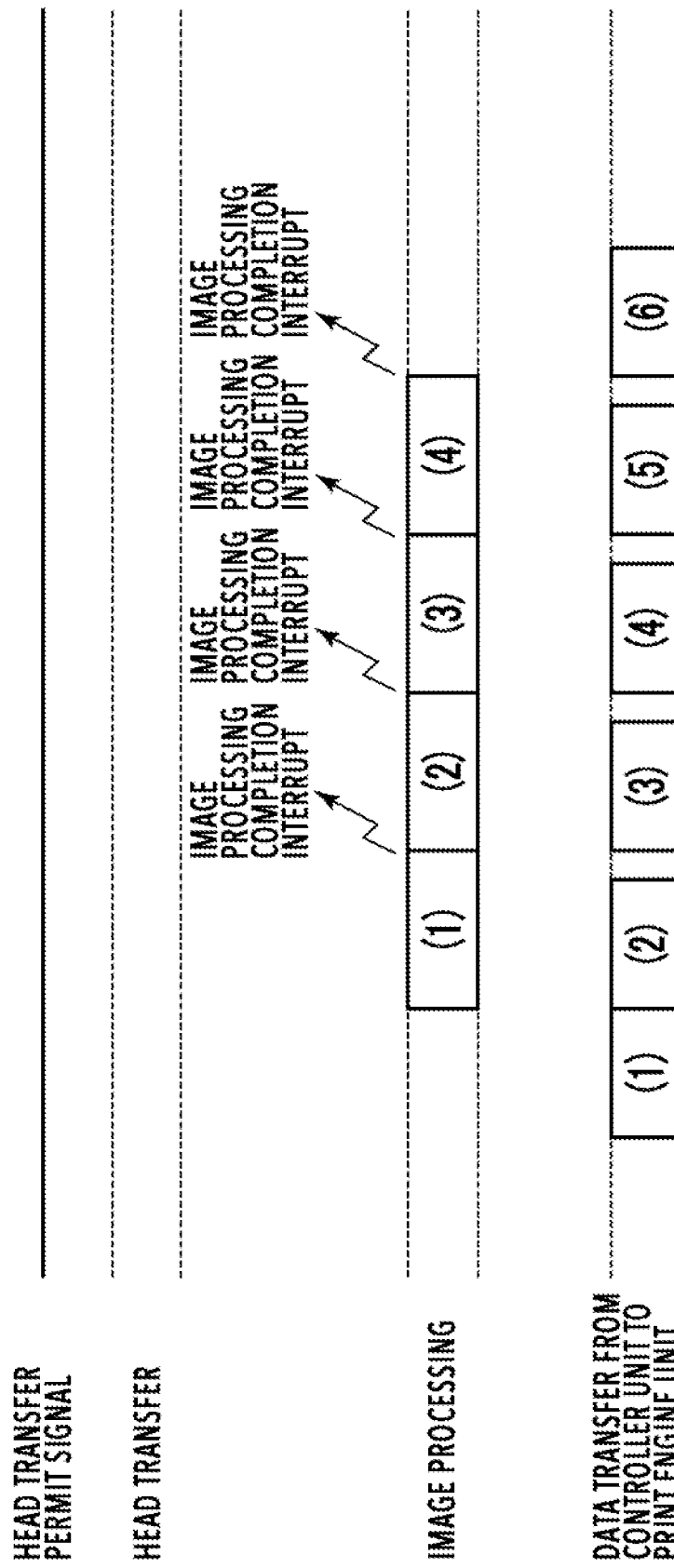
FIG. 9 is a timing chart showing each state before a conveyance operation of a printing medium.
Figure 10:
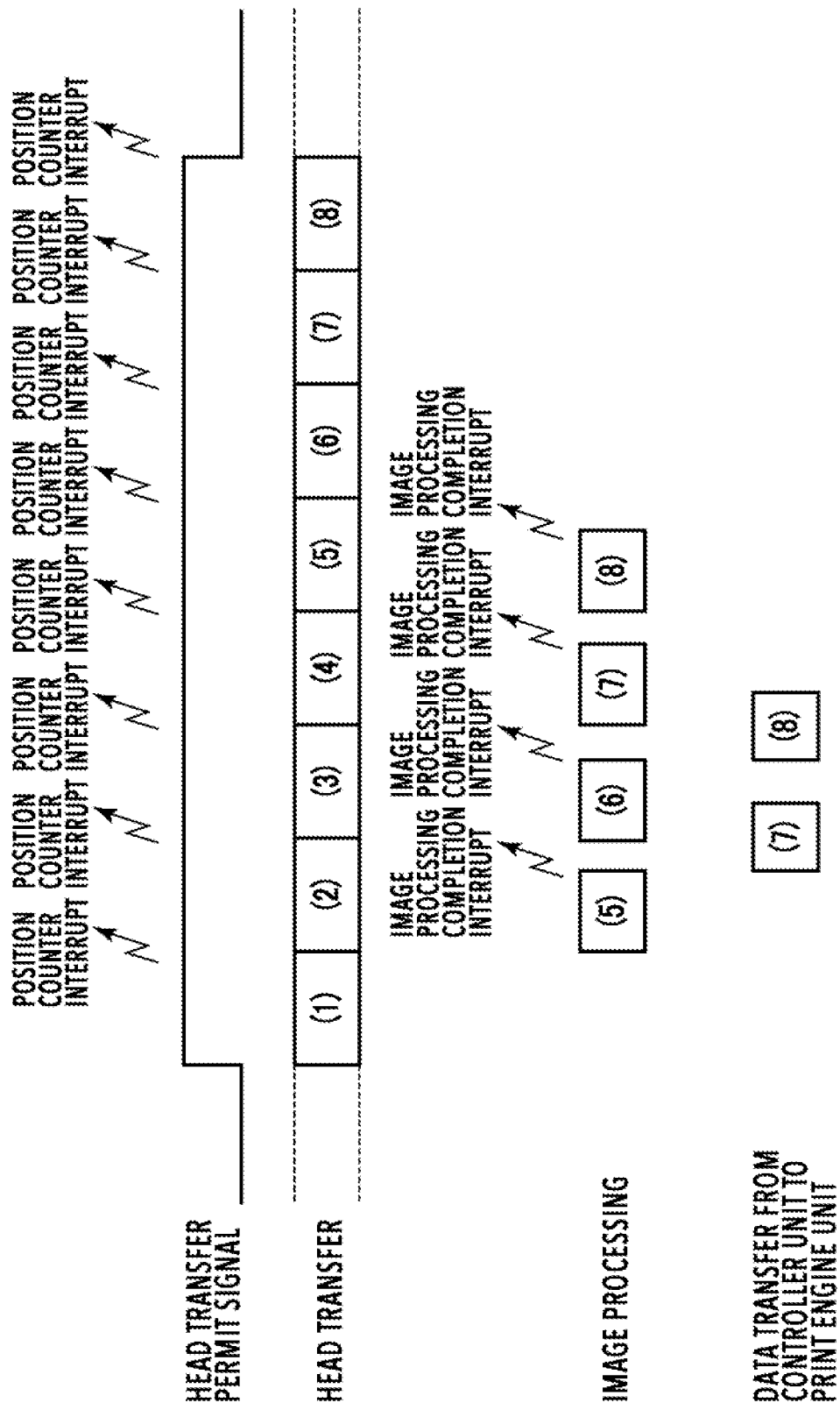
FIG. 10 is a timing chart showing each state at the time of the conveyance operation of a printing medium.
Figure 11:
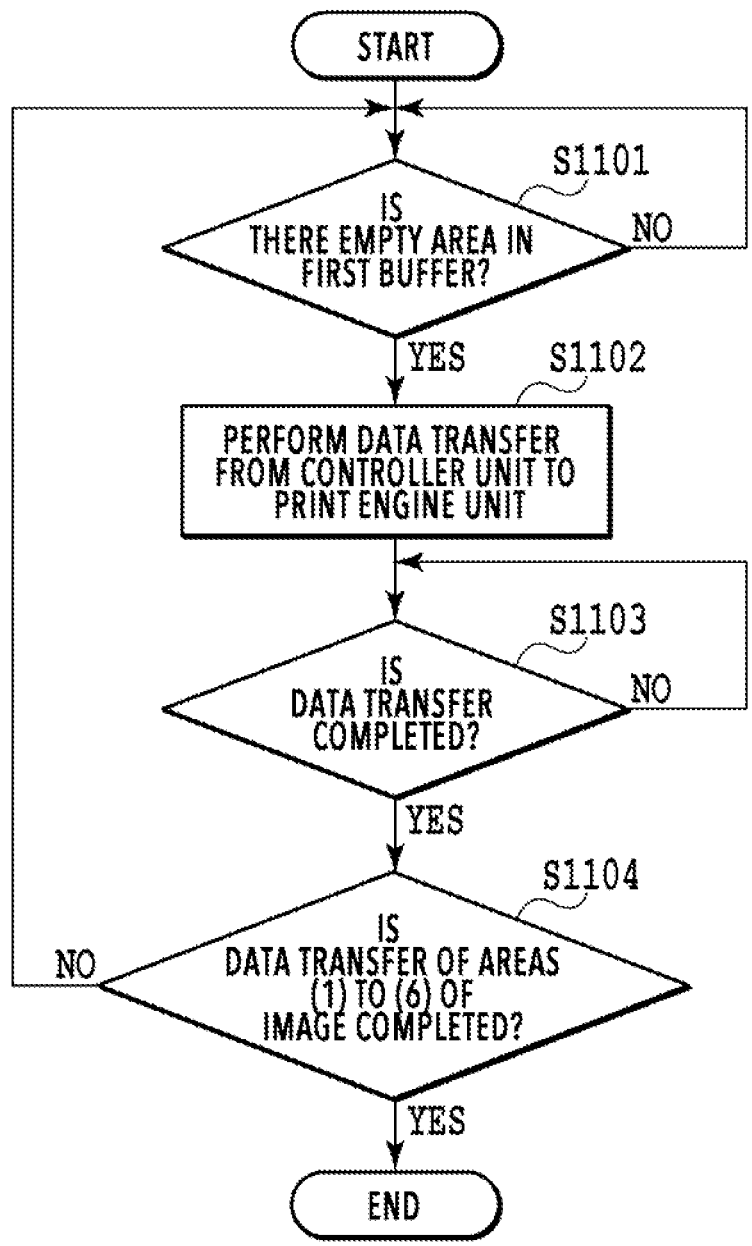
FIG. 11 is a flowchart of processing 1 before the conveyance operation of a printing medium.
Figure 12:
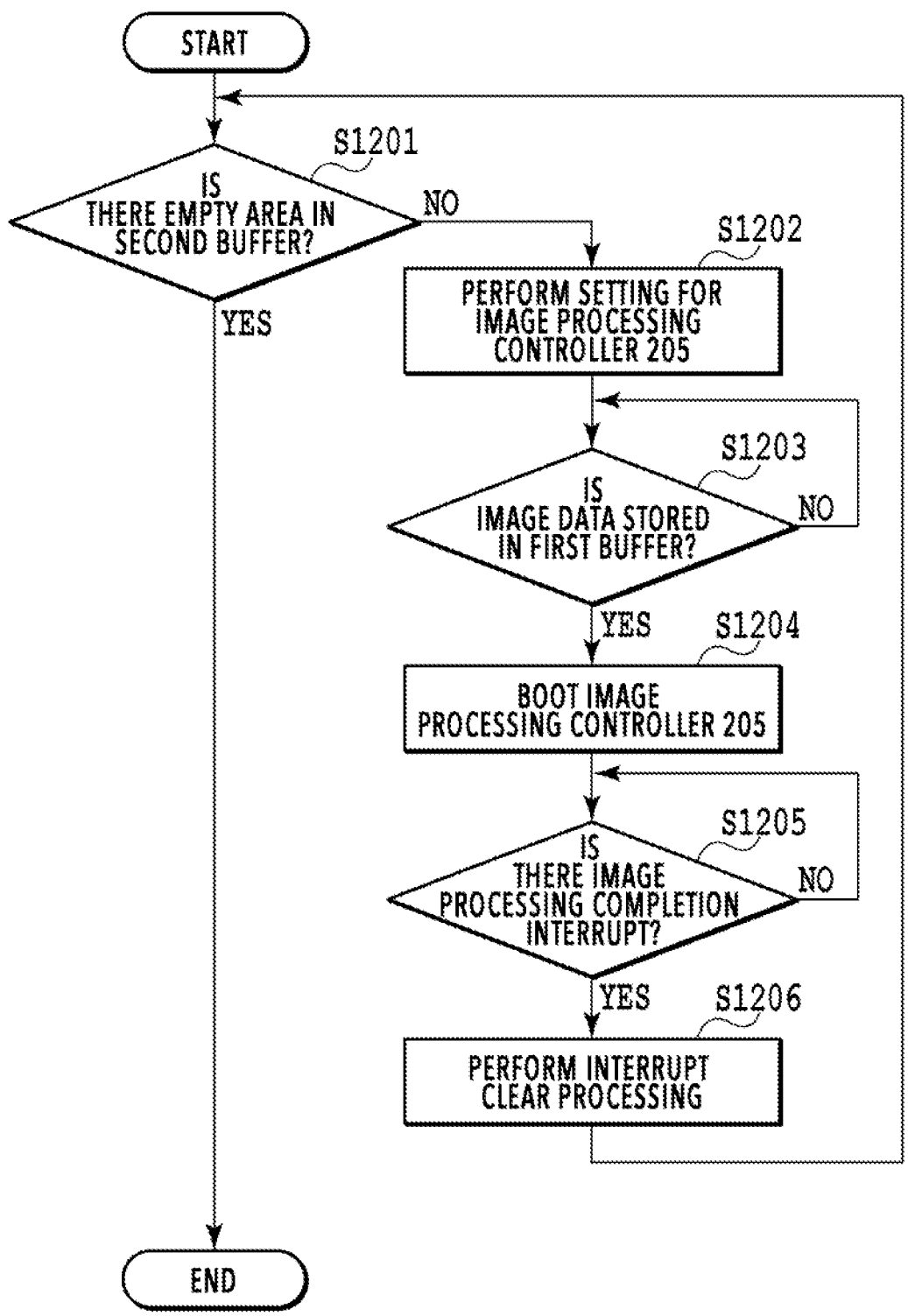
FIG. 12 is a flowchart of processing 2 before the conveyance operation of a printing medium.

Next, as the specific processing of the printing apparatus 1, transfer processing of image data and image processing before the conveyance operation of a printing medium are explained by using FIG. 9, FIG. 11, and FIG. 12. Further, transfer processing of image data, image processing, and transfer processing of print data at the time of the conveyance operation of a printing medium are explained by using FIG. 10, FIG. 13, FIG. 14, and FIG. 15.

FIG. 9 is a timing chart before the conveyance operation of a printing medium. Here, a relationship is shown between the head transfer permit signal, the state of print data transfer to the print head 8, the state of image processing by the image processing controller 205, and the state of image data transfer from the controller unit 100 to the print engine unit 200.

As described previously, FIG. 9 shows each state before the conveyance operation of a printing medium (that is, before execution of the printing processing) as a timing chart, and therefore, the head transfer permit signal is kept in the state of the Low level and head transfer of print data is not performed. On the other hand, data transfer (hereinafter, processing 1) from the controller unit 100 to the print engine unit 200 and image processing (hereinafter, processing 2) by the image processing controller 205 are performed until the storage areas of the first buffer and the second buffer are filled fully. In this case, the processing is performed until the image data of the area (5) is stored in the storage area A and the image data of the area (6) is stored in the area B of the first buffer, and the print data of the area (1) is stored in the area K, the print data of the area (2) is stored in the area L, the print data of the area (3) is stored in the area M, and the print data of the area (4) is stored in the area N of the second buffer.

In the following, in accordance with the timing chart in FIG. 9, processing 1 and processing 2 are explained. First, processing 1 is performed for the area (1) of the image. Then, after processing 1 is completed (that is, after the image data of the area (1) is stored in the storage area A of the first buffer), processing 2 is performed for the area (1).

At the same time, the storage area B of the first buffer is empty, and therefore, processing 1 is performed for the area (2) and the image data of the area (2) is stored in the storage area B. Then, after processing 2 for the area (1) is completed, the image processing controller 205 outputs an image processing completion interrupt signal to the print controller 202. The print controller 202 having received the image processing completion interrupt signal notifies the main controller 101 that processing 2 for the area (1) is completed.

The main controller 101 performs processing 1 for the area (3) because an empty area is produced in the storage area A of the first buffer in response to the completion of processing 2 for the area (1). Due to this, the image data of the area (3) is stored in the storage area A. Further, at the point in time at which processing 1 for the area (3) is started, processing 1 for the area (2) is already completed, and therefore, the image processing controller 205 performs processing 2 for the area (2).

The series of processing such as this is performed similarly also in the subsequent areas until all the storage areas of the first buffer and the second buffer are filled fully. That is, as described previously, the series of processing is performed until that state is brought about where the image data corresponding to the areas (5) and (6) is stored in the first buffer and the print data corresponding to the areas (1) to (4) is stored in the second buffer.

FIG. 11 is a flowchart of the data transfer processing from the controller unit 100 to the print engine unit 200 before the conveyance operation of a printing medium. Specifically, a flowchart showing a procedure of processing 1 relating to the areas (1) to (6) before the conveyance operation of a printing medium.

At S1101, the main controller 101 determines whether there is an empty area in the first buffer within the RAM 204. In a case where determination results at this step are affirmative, the processing advances to S1102. On the other hand, in a case where the determination results are negative, the main controller 101 waits until an empty area is produced in the first buffer.

At S1102, the main controller 101 transfers the image data corresponding to one of the eight images obtained by equally dividing the image from the controller unit 100 to the print engine unit 200. That is, the main controller 101 performs processing 1. At S1102, each time the processing at S1101 to S1104 is performed, the processing-target area is shifted to the downstream side in the conveyance direction (that is, the processing target is changed from the area (1) to the area (2), from the area (2) to the area (3), . . . ) and processing 1 is performed in order from the area (1).

At S1103, the main controller 101 determines whether processing 1 is completed for the image data transferred from the controller unit 100 to the print engine unit 200 at S1102 and storage of the image data to the first buffer is completed. In a case where determination results at this step are affirmative, the processing advances to S1104. On the other hand, in a case where the determination results are negative, the main controller 101 waits until processing 1 is completed.

At S1104, the main controller 101 determines whether processing 1 is completed for the areas (1) to (6) of the image. In a case where determination results at this step are affirmative, the series of processing is terminated. On the other hand, in a case where the determination results at this step are negative, the processing returns to S1101. The above is the contents of the data transfer processing from the controller unit 100 to the print engine unit 200 before the conveyance operation of a printing medium according to the present embodiment.

FIG. 12 is a flowchart showing processing of the print controller 202 for causing the image processing controller 205 to perform image processing (processing 2) before the conveyance operation of a printing medium. Specifically, a flowchart to perform the procedure of processing 2 for the areas (1) to (4).

At S1201, the print controller 202 determines whether there is an empty area in the second buffer. In a case where determination results at this step are affirmative, the print controller 202 regards the image processing (that is, creation of print data) for the areas (1) to (4) as being completed and the series of processing is terminated. On the other hand, in a case where the determination results at this step are negative, the processing advances to S1202.

At S1202, the print controller 202 performs various kinds of setting of, for example, such as an image processing parameter and a DMA address, for the image processing controller 205. Regarding S1202, in a case where the processing is performed for the area (1), after this, it is not necessarily required to perform the processing, and it is sufficient to perform the processing appropriately in accordance with a change in environment or the like.

At S1203, the print controller 202 determines whether image data is stored in the first buffer within the RAM 204. In a case where determination results at this step are affirmative, the processing advance to S1204. On the other hand, in a case where the determination results are negative, the print controller 202 waits until image data is stored in the first buffer.

At S1204 the print controller 202 boots the image processing controller 205, causes the image processing controller 205 to start image processing (that is, processing 2), and stores print data created by the image processing in the second buffer. At this step, the print controller 202 functions as a storage control unit configured to store print data in the storage area.

At S1205, the print controller 202 determines whether an interrupt signal relating to image processing completion, which gives a notification of the completion of processing 2, is received. In a case where determination results at this step are affirmative, the processing advances to S1206. On the other hand, in a case where the determination results are negative, the print controller 202 waits until an interrupt signal is received.

At S1206, the print controller 202 performs clear processing (referred to as interrupt clear processing) of the received interrupt signal. After performing the processing at S1206, the print controller 202 shifts the processing-target area to the downstream side in the conveyance direction (that is, for example, the processing-target area is changed from the area (1) to the area (2), from the area (2) to the area (3), and so on). After this, the processing returns to S1201. The above is the contents of the image processing by the image processing controller 205 before the conveyance operation of a printing medium according to the present embodiment.

Next, transfer processing of image data, image processing, and transfer processing of print data (head transfer processing) at the time of the conveyance operation of a printing medium are explained. FIG. 10 is a timing chart showing the head transfer permit signal, the state of head transfer, the state of image processing of the image processing controller 205, and the state of data transfer from the controller unit 100 to the print engine unit 200 at the time of the conveyance operation of a printing medium.

As described previously, FIG. 10 shows the state at the time of the conveyance operation of a printing medium (that is, the state where an image is formed while conveying a printing medium) as a timing chart and the state is shown as a state that follows the state shown in FIG. 9.

As shown in FIG. 10, the head transfer permit signal becomes the H level at timing at which the printing operation is started. In a case where the head transfer trigger signal becomes the H level in the state where the head transfer permit signal is kept at the H level, the print controller 202 reads the print data corresponding to the area (1) from the storage area K within the second buffer and transfers the print data to the print head 8 via the head I/F 206.

The head transfer trigger signal is the signal shown in FIG. 5 (that is, the signal output from the head transfer timing signal generation unit 1001 based on the position counter value input from the position counter 1002) and is not shown schematically in FIG. 10. Further, in the position counter 1002, as the position counter value, a value indicating the position a distance corresponding to one eighth of the entire image area apart from the front end of the image area is set in advance as the position counter interrupt value. In a case where the printing medium is conveyed up to the position (that is, in a case where the position counter value corresponding to the conveyance amount corresponding to one eighth of the image is reached), the position counter 1002 outputs a position counter interrupt signal to the print controller 202.

Here, the case is explained where the print data read from the second buffer is transferred to the print head 8, but in more detail, the control data including the print data (that is, data for controlling the print head 8) is transmitted to the print head 8. In the control data, in addition to the print data, various kinds of setting information relating to the printing processing, such as information for controlling the ink ejection amount, is included.

Upon receipt of the position counter interrupt signal, the print controller 202 performs the interrupt clear processing for the position counter 1002. Next, the print controller 202 sets a value indicating a position a distance corresponding to two eighths of the entire image area apart from the front end of the image area to the register of the position counter 1002 as a position counter value. Because of this, in a case where the printing medium is conveyed up to the position (that is, in a case where the position counter value corresponding to the conveyance amount corresponding to two eighths of the image is reached), the position counter interrupt signal is output to the print controller 202.

Further, the print controller 202 determines that the transfer of the print data corresponding to the area (1) to the print head 8 is completed because of the reception of the position counter interrupt signal. That is, by the reception of the position counter interrupt signal, the print controller 202 determines (regards) that an empty capacity is produced in the second buffer because the print data of the area (1) is transferred to the print head 8. By receiving the position counter interrupt signal (that is, by determining that an empty capacity is produced in the second buffer), the print controller 202 starts processing 2 for the image data corresponding to the area (5), which is stored in the storage area A within the first buffer. Then, in a case where processing 2 is completed, the print controller 202 stores the generated print data of the area (5) in the second buffer. As described above, in the present embodiment, processing 2 is started in accordance with the position counter interrupt signal generated based on the signal output from the encoder, and therefore, it is not necessary for the print controller 202 to check an empty capacity of the second buffer.

After this also, the print controller 202 similarly determines that the print data corresponding to one eighth of the image is transferred to the print head 8 each time of receiving the position counter interrupt signal from the position counter 1002 and performs the interrupt clear processing and processing 2, described previously.

Further, in a case of receiving a completion notification (image processing completion interrupt signal) relating to processing 2 from the print controller 202, the main controller 101 sequentially transfers each piece of image data corresponding to the areas (7) and (8), which is not transferred yet, to the print engine unit 200. As described above, the transfer processing of image data (that is, processing 1), the image processing (that is, processing 2), and the transfer processing of print data at the time of the conveyance operation of a printing medium are performed.

Figure 15:
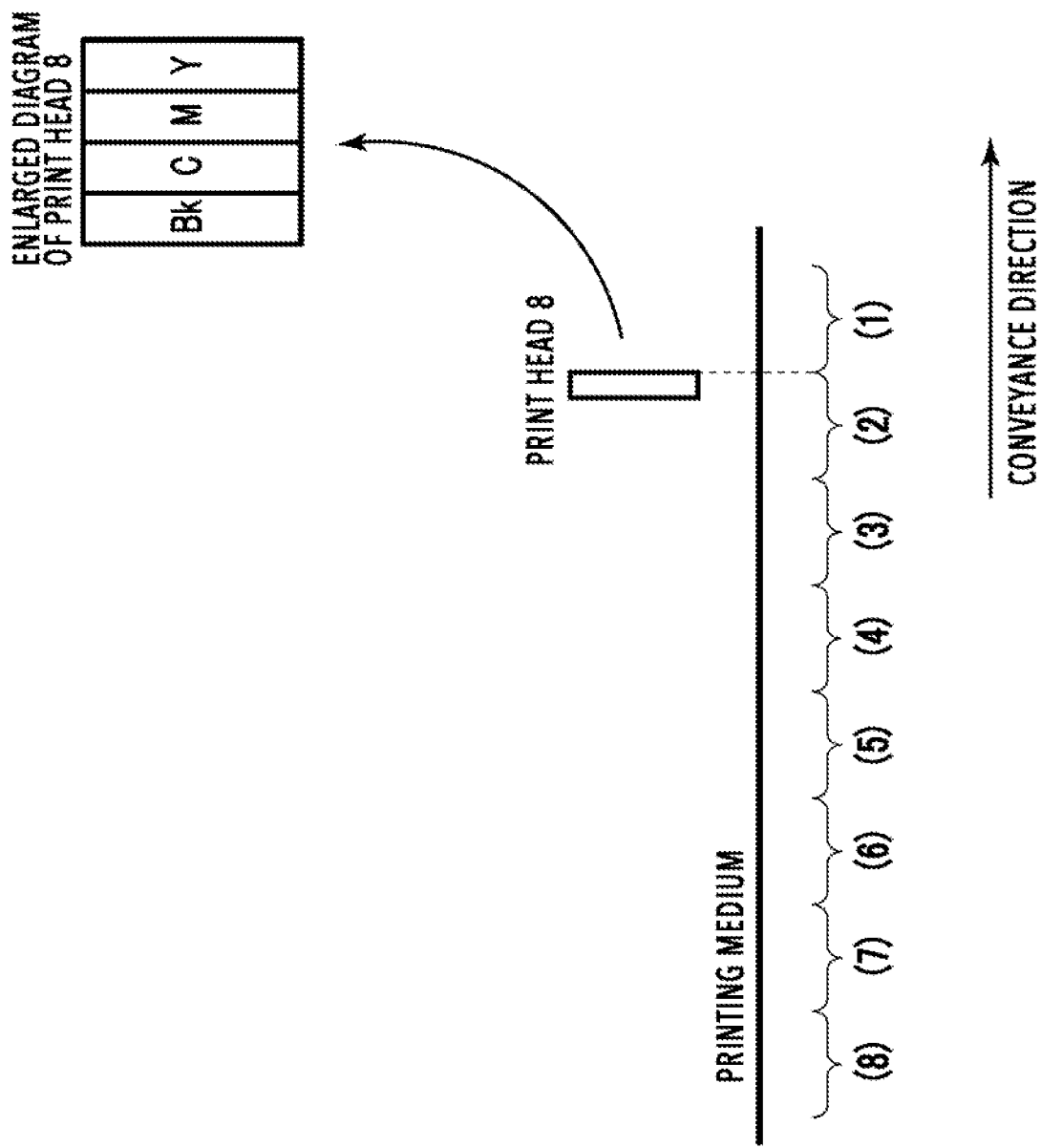
FIG. 15 is a diagram showing a position relationship between a print head 8 and an image that is formed on a printing medium at timing at which a first position counter interrupt signal is output.

As a supplement, by using FIG. 15, the timing at which the position counter interrupt signal is output is explained. FIG. 15 is a diagram showing a position relationship between the print head and an image that is printed on a printing medium. In FIG. 15, the timing at which the first position counter interrupt signal is output in FIG. 10 described previously is shown.

At the timing at which the printing medium is conveyed to the position shown in FIG. 15, the position counter 1002 outputs the position counter interrupt signal indicating the completion of ink ejection of all the colors for the area (1) of the image (that is, completion of printing processing).

Figure 13:
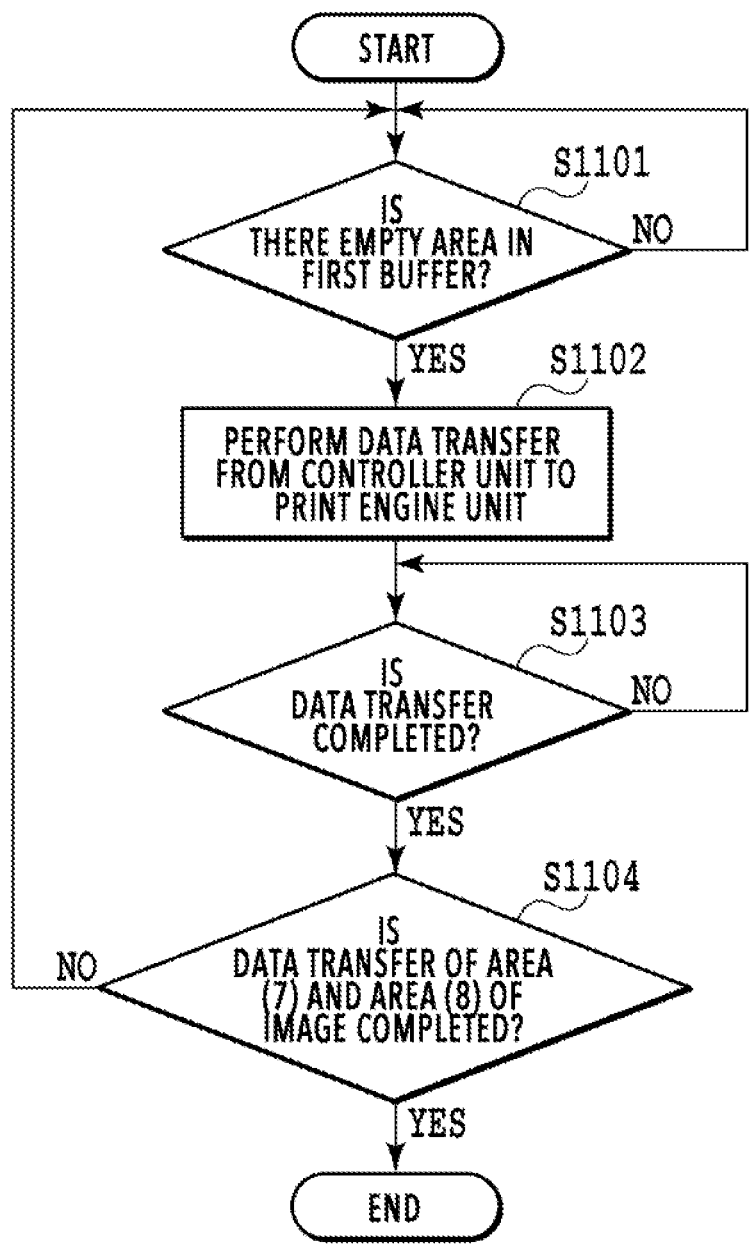
FIG. 13 is a flowchart of processing 1 at the time of the conveyance operation of a printing medium.

FIG. 13 is a flowchart of image data transfer processing from the controller unit 100 to the print engine unit 200 at the time of the conveyance operation of a printing medium. Specifically, FIG. 13 is a flowchart showing a procedure of processing 1 relating to the areas (7) and (8) at the time of the conveyance operation of the printing medium and the procedure is the same as that of processing 1 relating to the areas (1) to (6) before the conveyance operation of a printing medium described previously.

At S1301, the main controller 101 determines whether there is an empty area in the first buffer within the RAM 204. In a case where determination results at this step are affirmative, the processing advances to S1302. On the other hand, in a case where the determination results are negative, the main controller 101 waits until an empty area is produced in the first buffer.

At S1302, the main controller 101 transfers the image data corresponding to one of the eight areas obtained by equally dividing the image to the print engine unit 200. That is, the main controller 101 performs processing 1. At S1302, each time the processing at S1301 to S1304 is performed, the processing target-area is shifted to the downstream side in the conveyance direction (that is, the processing target is changed from the area (7) to the area (8)) and processing 1 is performed in order from the area (7).

At S1303, the main controller 101 determines whether processing 1 is completed for the image data transferred from the controller unit 100 at S1302, that is, whether the transfer to the print engine unit 200 is completed is determined. In a case where determination results at this step are affirmative, the processing advances to S1304. On the other hand, in a case where the determination results are negative, the main controller 101 waits until processing 1 is completed.

At S1304, the main controller 101 determines whether processing 1 is completed for the areas (7) and (8) of the image. In a case where determination results at this step are affirmative, the series of processing is terminated. On the other hand, in a case where the determination results at this step are negative, the processing returns to S1301. The above is the contents of the data transfer processing from the controller unit 100 to the print engine unit 200 at the time of the conveyance operation of a printing medium according to the present embodiment.

Figure 14:
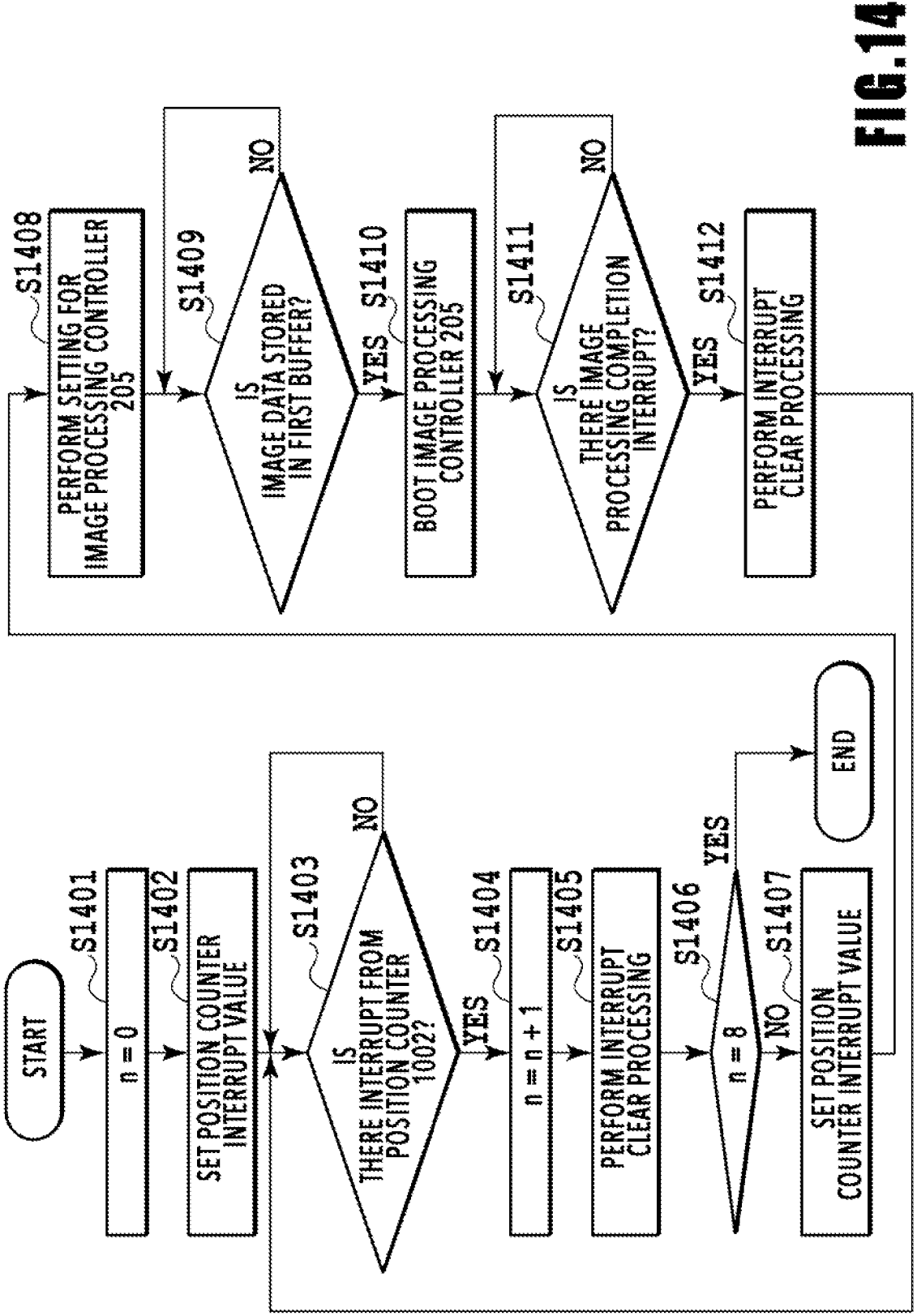
FIG. 14 is a flowchart of processing in a print engine unit 200 at the time of the conveyance operation of a printing medium.

FIG. 14 is a flowchart of processing in the print engine unit 200 at the time of the conveyance operation of a printing medium. Specifically, FIG. 14 is a flowchart showing a procedure of printing processing including the conveyance operation of a printing medium relating to the areas (1) to (8) and processing 2 relating to the areas (5) to (8).

At S1401, the print controller 202 initializes a variable n for counting the number of times of position counter interrupt output from the position counter 1002. That is, the print controller 202 sets 0 to the variable n.

At S1402, the print controller 202 sets a position counter interrupt value to the register within the position counter 1002. The position counter interrupt value that is set at this step is, specifically, a value at which a position counter interrupt signal is output in a case where the printing medium is conveyed from the front end of the image up to the position corresponding to one eighth in the conveyance direction.

At S1403, the print controller 202 determines whether the position counter interrupt signal output from the position counter 1002 is received. In a case where determination results at this step are affirmative, the processing advances to S1404. On the other hand, in a case where the determination results are negative, the print controller 202 waits until the position counter interrupt signal is received.

At S1404, the print controller 202 adds 1 to the variable n (increments the variable n) in response to the reception of the position counter interrupt signal at S1403.

At S1405, the print controller 202 performs the interrupt clear processing for the position counter 1002.

At S1406, the print controller 202 determines whether the variable n is 8, that is, whether the position counter interrupt signal is received eight times. In a case where determination results at this step are affirmative, it is regarded that the printing operation is completed and the series of processing is terminated. On the other hand, in a case where the determination results are negative, the processing advances to S1407.

At S1407, the print controller 202 sets the position counter interrupt value to the register within the position counter 1002. The position counter interrupt value that is set at this step is, specifically, a value at which the position counter interrupt signal is output in a case where the printing medium is conveyed by a distance corresponding to one eighth of the entire image area.

At S1408, the print controller 202 performs various kinds of setting of, for example, such as an image processing parameter and a DMA address, for the image processing controller 205. Regarding S1408, in a case where the processing is performed for the area (5), after this, it is not necessarily required to perform the processing and it is sufficient to perform the processing appropriately in accordance with a change in environment or the like.

At S1409, the print controller 202 determines whether the image data for which the transfer from the controller unit 100 to the print engine unit 200 is completed (that is, image data for which processing 1 is completed) is stored in the first buffer within the RAM 204. In a case where determination results at this sep are affirmative, the processing advances to S1410. On the other hand, in a case where the determination results are negative, the print controller 202 waits until the image data is stored in the first buffer.

At S1410, the print controller 202 boots the image processing controller 205 and causes the image processing controller 205 to start image processing (that is, processing 2).

At S1411, the print controller 202 determines whether the interrupt signal relating to the image processing completion notifying the print controller 202 of completion of processing 2 is received. In a case where determination results at this step are affirmative, the processing advances to S1412. On the other hand, in a case where the determination results are negative, the print controller 202 waits until the interrupt signal is received.

At S1412, the print controller 202 performs processing to clear the received interrupt signal (referred to as interrupt clear processing). Next, the processing returns to S1403. The above is the contents of the processing in the print engine unit 200 at the time of the conveyance operation of a printing medium according to the present embodiment.

<About Aspect in which Data for which Inclination Correction is Performed is Transferred Sequentially>

In the following, based on the configuration explained hitherto, an aspect in which data for which inclination correction has been performed is transferred sequentially is explained.

Figure 16:
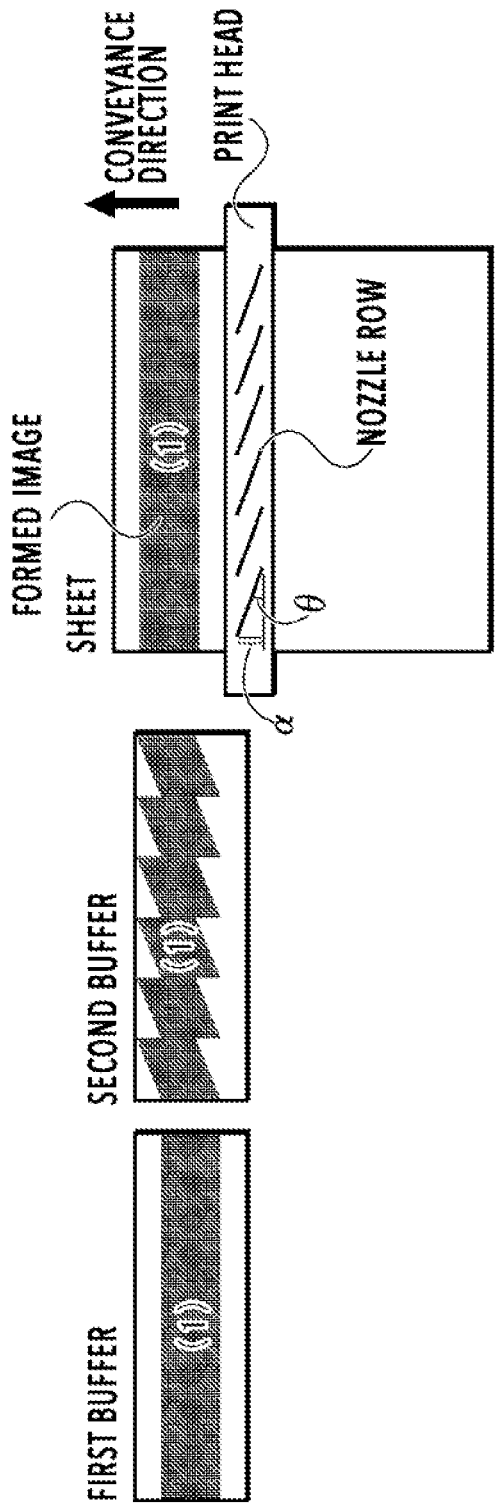
FIG. 16 is a diagram showing the way print data for which inclination correction has been performed is stored in the second buffer and as a result of performing printing based on the print data, a horizontal image is formed on a sheet.

FIG. 16 is a diagram showing the way an inclination is corrected on the memory of the second buffer shown in FIG. 8. As shown schematically, a plurality of nozzle rows including a plurality of nozzles ejecting ink is arrayed. Here, the nozzle rows on the print head are attached obliquely with respect to the direction intersecting with the conveyance direction (that is, also referred to as the direction in which the print head extends, the lengthwise direction of the print head, and the horizontal direction), that is, the nozzle rows are attached so as to have an inclination. The angle of the inclination of the nozzle row, in detail, the acute angle measured from the horizontal direction in the clockwise direction is defined as θ. As shown in FIG. 16, at the time of storing the print data based on the image data stored in the first buffer in the second buffer, correction is performed so that the print data corresponding to each nozzle row has the angle θ from the horizontal direction in the counterclockwise direction. Due to this, printing is performed in synchronization with the encoder of the conveyance roller, and therefore, it is possible to form an image with no inclination with respect to the conveyance direction on a sheet.

FIG. 17A to FIG. 17C, FIG. 18A to FIG. 18C, and FIG. 19 are diagrams showing an aspect of data processing in a case where the inclination correction shown in FIG. 16 is performed. Specifically, an aspect is shown in which divided image data (referred to as divided data) is stored in the first buffer (see FIG. 7) and print data created based on the stored divided data is stored in the second buffer (see FIG. 8).

Figure 17A:
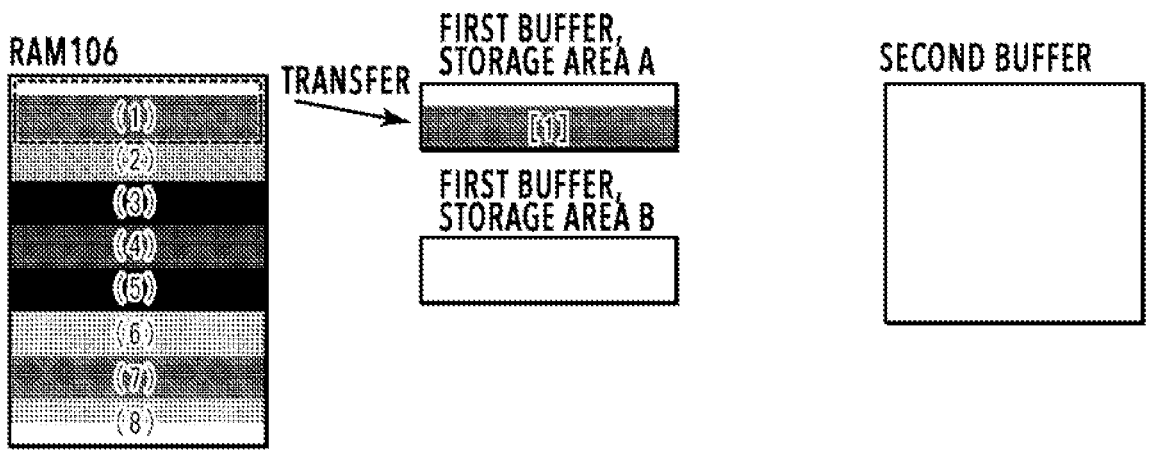
FIG. 17A to FIG. 17C are diagrams showing an aspect in which print data is created by performing image processing accompanied by inclination correction for divided image data and stored in the second buffer.

As shown in FIG. 17A, in the RAM 106 (image data storage area), image data corresponding to the entire printing-target image area is stored. First, of the image data stored in the RAM 106, divided data corresponding to the area (1) is transferred to the first buffer and stored in the storage area A. Here, the divided data that is transferred to the first buffer is image data of the area including a blank area with a length necessary for the inclination correction, in addition to the area (1).

Figure 17B:
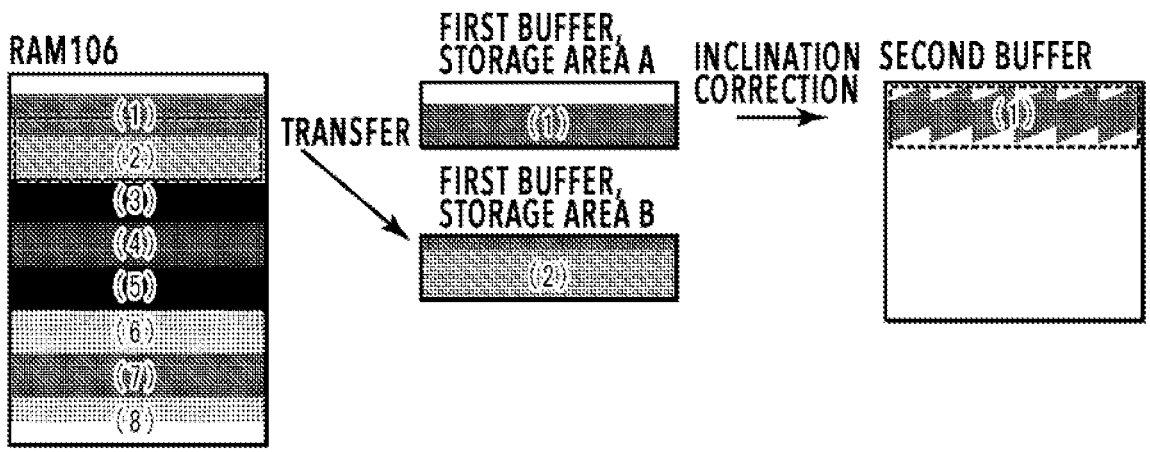

Following the above, as shown in FIG. 17B, print data is created by performing image processing accompanied by the inclination correction shown in FIG. 16 for the divided data corresponding to the area (1) stored in the storage area A, and the created print data is stored in the second buffer. Further, of the image data stored in the RAM 106, divided data corresponding to the area (2) is transferred to the first buffer and stored in the storage area B. At this time, the original image data is divided so that the divided data that is transferred to the first buffer includes a part of the area (1). A part of the area (1) is, specifically, a portion whose position in the horizontal direction after the inclination correction becomes equal to the area (2) on the second buffer.

Figure 17C:
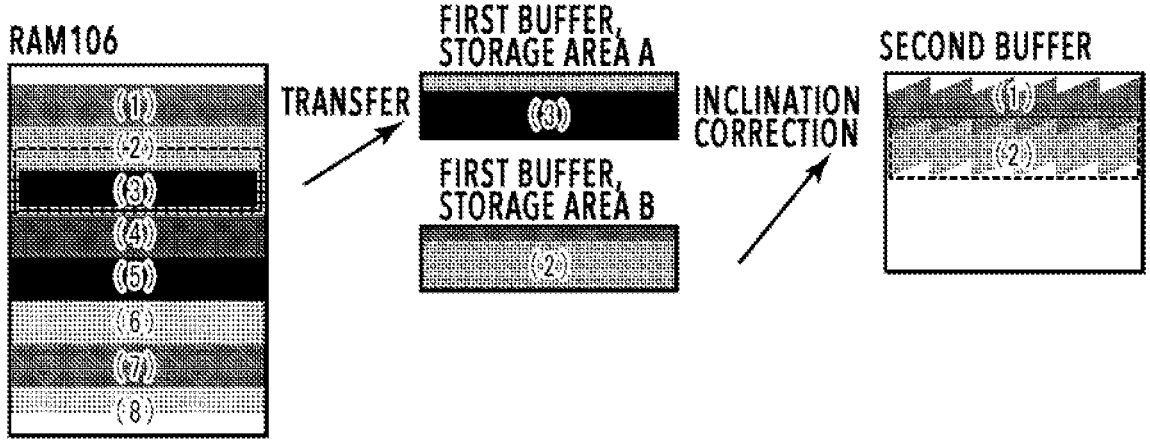

Following the above, as shown in FIG. 17C, print data is created by performing image processing accompanied by the inclination correction shown in FIG. 16 for the divided data corresponding to the area (2) stored in the storage area B.

The print data corresponding to the area (2), which is created here, is stored in the second buffer as the print data that is continuous with the print data of the area (1). Further, of the image data stored in the RAM 106, divided data corresponding to the area (3) is transferred to the first buffer and stored in the storage area A. At this time, the original image data is divided so that the divided data that is transferred to the first buffer includes a part of the area (2). A part of the area (2) is, specifically, a portion whose position in the horizontal direction after the inclination correction becomes equal to the area (3) on the second buffer.

Figure 18A:
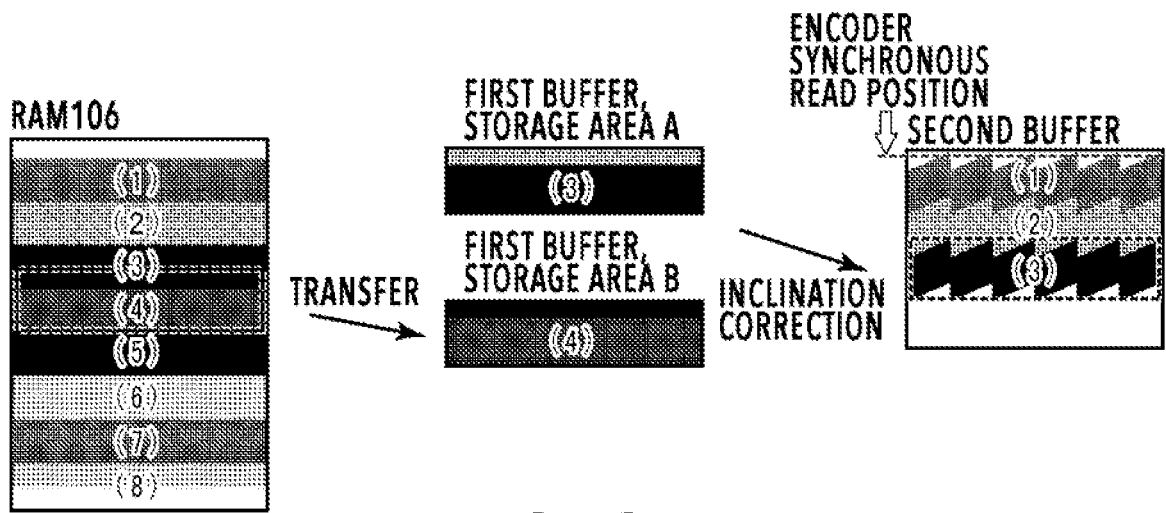
FIG. 18A to FIG. 18C are diagrams showing an aspect in which print data is created by performing image processing accompanied by inclination correction for divided image data and stored in the second buffer.

Following the above, as shown in FIG. 18A, print data is created by performing image processing accompanied by the inclination correction shown in FIG. 16 for the divided data corresponding to the area (3) stored in the storage area A. The print data corresponding to the area (3), which is created here, is stored in the second buffer as the print data that is continuous with the print data of the area (2). Further, of the image data stored in the RAM 106, divided data corresponding to the area (4) is transferred to the first buffer and stored in the storage area B. At this time, the original image data is divided so that the divided data that is transferred to the first buffer includes a part of the area (3). A part of the area (3) is, specifically, a portion whose position in the horizontal direction after the inclination correction becomes equal to the area (4) on the second buffer. In this example, at this timing, it is regarded that the ink ejection by the print head based on the print data up to the encoder synchronous read position in FIG. 18A is completed.

Figure 18B:
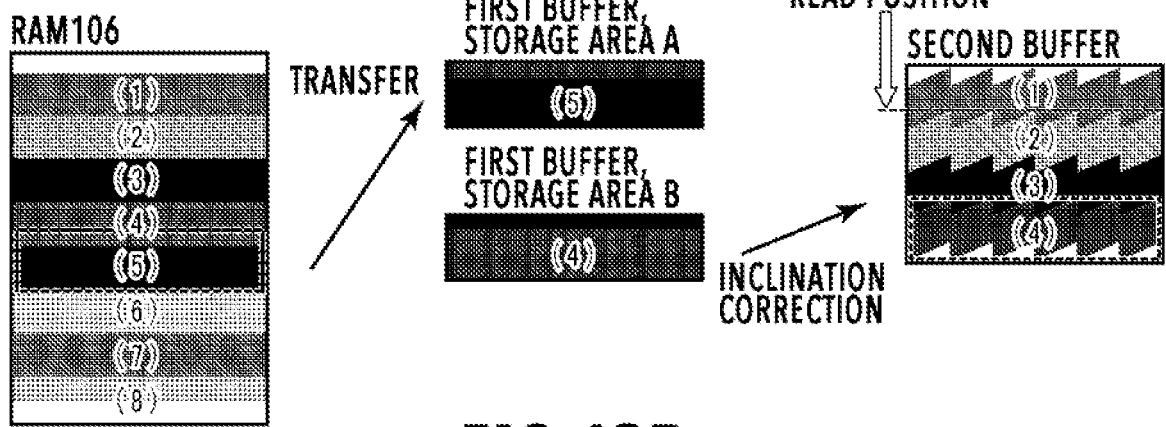

Following the above, as shown in FIG. 18B, the same processing as the processing described previously is performed, the divided data corresponding to the area (5) is stored in the storage area A, and the print data corresponding to the area (4) is stored in the second buffer. In this example, at this timing, it is regarded that, the ink ejection by the print head based on the print data up to the encoder synchronous read position in FIG. 18B is completed.

Figure 18C:
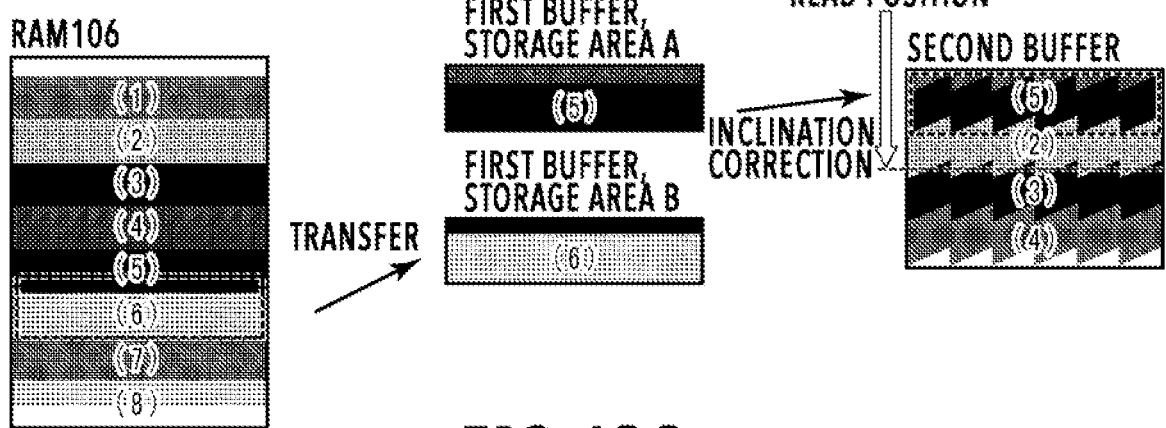
Figure 19:
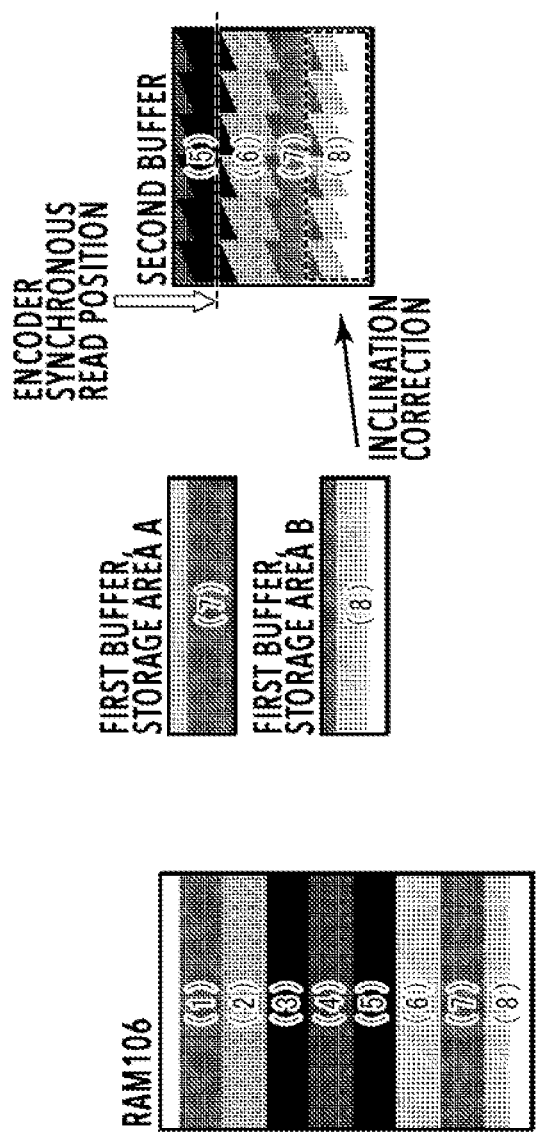
FIG. 19 is a diagram showing an aspect in which print data is created by performing image processing accompanied by inclination correction for divided image data and stored in the second buffer.

Following the above, as shown in FIG. 18C, the same processing as the processing described previously is performed, the divided data corresponding to the area (6) is stored in the storage area B, and the print data corresponding to the area (5) is stored in the second buffer. At the point in time at which the print data corresponding to the area (5) is stored in the second buffer, the print data corresponding to each of the areas (1) to (4) is already stored in the second buffer. Consequently, the print data corresponding to the area (5) is saved in an overwriting manner in the area (storage area K) in which the print data corresponding to the area (1) is stored.

Following the above, as a result of repeating the same processing as the processing described previously, a state shown in FIG. 19 is brought about finally. In this state, the print data corresponding to the area (8) is stored in the second buffer and in this print data, the blank area in accordance with the maximum inclination amount of the nozzle row exists on the downstream side in the conveyance direction. In a case where the encoder read position becomes equal to the rear end position of the print data corresponding to the area (8), the image formation onto a sheet is completed.

Figure 20:
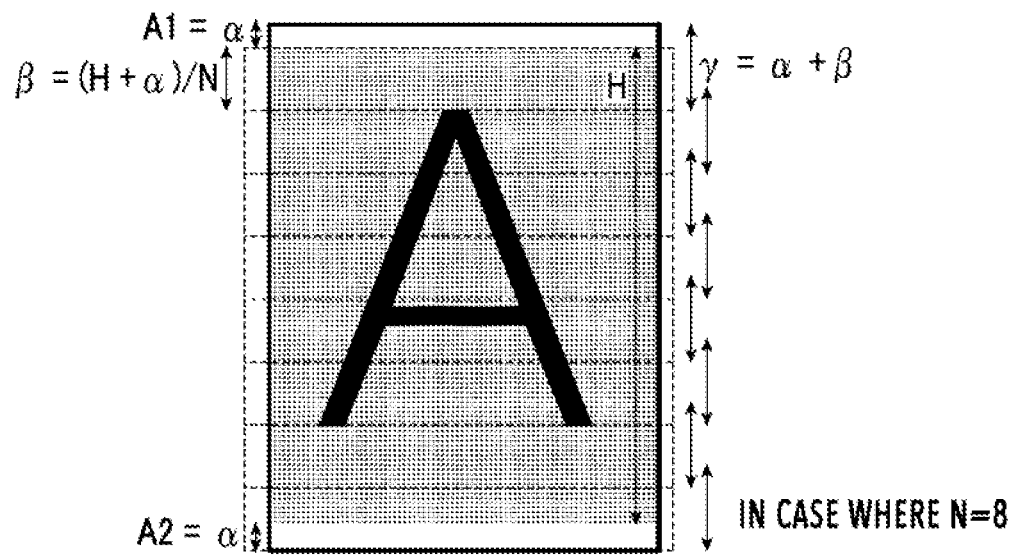
FIG. 20 is a diagram explaining a method of deriving a divided data length at the time of dividing image data on a RAM 106 and transferring to the first buffer.

FIG. 20 is a diagram explaining a method of deriving a divided data amount at the time of dividing the image data on the RAM 106 and transferring to the first buffer as shown in FIG. 17A to FIG. 17C.

The image data on the RAM 106 includes a blank area having a predetermined length at the front end and the rear end thereof. The reason is that, as shown in FIG. 17A to FIG. 17C, FIG. 18A to FIG. 18C, and FIG. 19, at the time of ejecting ink based on the print data corresponding to the area (1) and the area (8) in accordance with the encoder position on the second buffer, printing is not performed based on incorrect data at the front end and the rear end.

Here, $\alpha$ is the length (referred to as maximum inclination amount) of the shift in position in the conveyance direction between the nozzles on both ends included in the same nozzle row, which results from the inclination of the nozzle row. In this case, a length A1 of the blank area at the front end and a length A2 of the blank area at the rear end are $\alpha$, respectively, and therefore, A1 and A2 are equal to each other. N is the number of divisions of the image data and in this example, it is assumed that N is eight. As shown in FIG. 20, it is possible to derive $\beta$, which is the length of the divided image, by using expression (1) based on a height H of the original image, the maximum inclination amount $\alpha$, and the number N of divisions.

[Mathematical expression]

$$\beta=(H+\alpha)/N \quad\quad\quad \text{expression (1)}$$

As shown in FIG. 20, each piece of divided data derived by diving the image data so that the areas having the length necessary for the inclination correction overlap is transferred sequentially to the first buffer. A length $\gamma$ in the conveyance direction of the band image at the time of the transfer (length of the divided image that takes into consideration the inclination correction, corresponding to the divided data amount (referred to also as transfer amount)) is derived by using expression (2) based on the maximum inclination amount $\alpha$ and the length of the divided image $\beta$.

[Mathematical expression 2]

$$\gamma=\alpha+\beta \quad\quad\quad \text{expression (2)}$$

The maximum inclination amount $\alpha$ may be a fixed value in accordance with the inclination of the nozzle row, or a variable value. For example, it may also be possible to determine the maximum inclination amount $\alpha$ by adding an attachment error of the print head or by adding an error correction value due to ejection characteristics.

Figure 21:
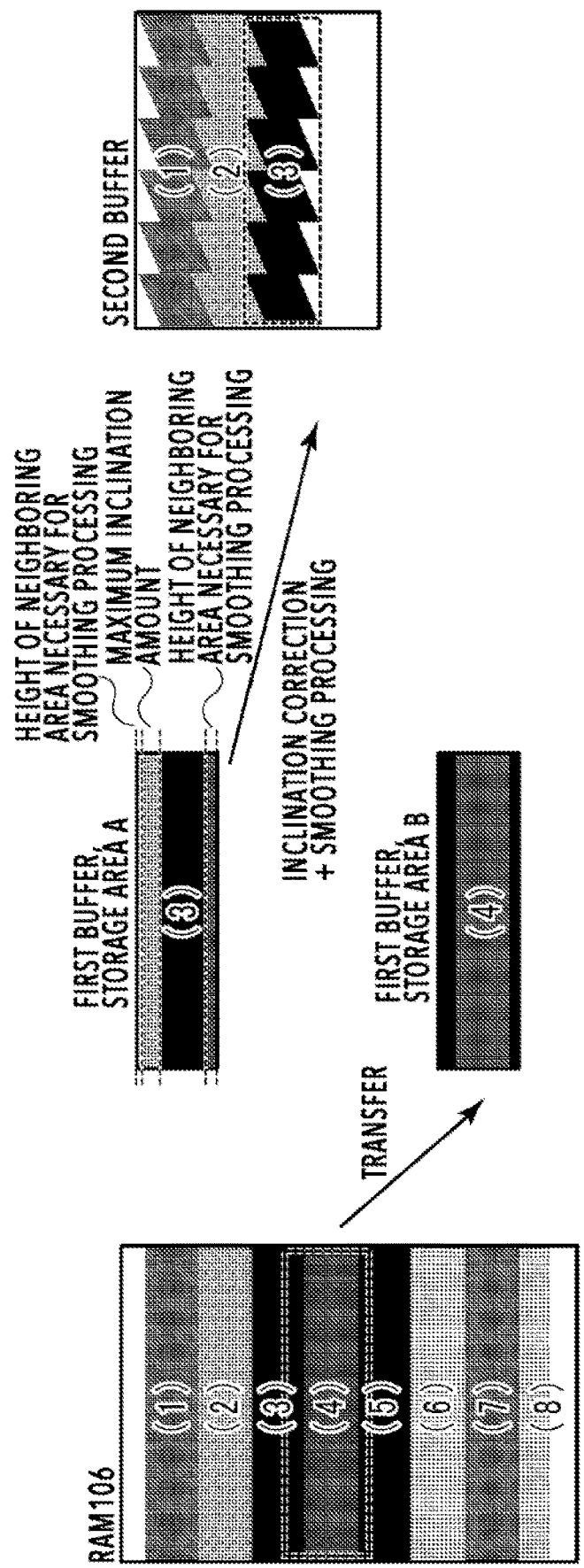
FIG. 21 is a diagram showing an aspect in which smoothing is performed, in addition to inclination correction.

FIG. 21 shows a case where smoothing processing is performed, which is one embodiment of the present invention. Specifically, at the time of creating print data by performing image processing accompanied by inclination correction for image data stored in the first buffer, smoothing processing is performed. In the smoothing processing, (the pixel included in) the area in the vicinity of the target pixel is referred to and the pixel value of the target pixel is converted.

In this case, as shown in FIG. 21, in addition to the area necessary for inclination correction (that is, area having the maximum inclination amount), the image data of the area including the area in the vicinity necessary for smoothing is transferred to the first buffer. As described above, appropriately adjusting the data transfer amount in accordance with (the length of) the area necessary in the processing performed for the image data stored in the first buffer is also one of the embodiments of the present invention.

As explained above, according to the present invention, even in a case where inclination correction is performed, it is made possible to keep continuity of the print data on the second buffer while saving the use amount of the RAM 204 necessary temporarily, that is, the capacity of the first buffer and the second buffer. Consequently, it is possible to appropriately form an image on a printing medium.

Other Embodiments

In the embodiment described previously, the aspect is explained in which the image that is the target of printing processing is divided into eight images and each time the printing medium is conveyed by an amount corresponding to one of the eight divided images (that is, area corresponding to one eighth of the image), the position counter interrupt signal is output. However, the aspect in which the position counter interrupt signal is output is not necessarily limited to this. It may also be possible to output the position counter interrupt signal each time the printing medium is conveyed by an amount corresponding to an area other than the area corresponding to one eighth of the image (for example, area corresponding to one sixteenth of the image).

Further, explanation is given by supposing that the first buffer has the structure in which two pieces of image data, each corresponding to one eighth of the image, are stored, but as long as the storage capacity of the RAM 204 accepts, the structure may be a configuration in which three or more pieces of image data are stored. This also applies to the second buffer and explanation is given by supposing that the second buffer has the structure in which four pieces of print data, each corresponding to one eighth of the image, are stored, but as long as the storage capacity of the RAM 204 accepts, the structure may be a configuration in which an arbitrary number (however, two or more) of pieces of image data is stored.

The capacity of the first buffer and that of the second buffer are set respectively based on the speed (communication speed) of data transfer to the print engine unit 200, the speed (conversion speed) of conversion processing from image data into print data, and the speed of data transfer to the print head 8. The capacity ratio between the first buffer and the second buffer is also set similarly.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, in a case where print data for which inclination correction processing has been performed is transferred sequentially and stored in a storage area, it is made possible to keep continuity of the data.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-067033, filed Mar. 30, 2018, which is hereby incorporated by reference wherein in its entirety.

What is claimed is:

1. A printing apparatus comprising:
    a line print head in which a plurality of nozzle rows including a plurality of nozzles ejecting ink is arrayed and which is extended along a first direction intersecting with a conveyance direction of a printing medium, each of the nozzle rows having an inclination with respect to the first direction;
    a creation unit configured to create a plurality of pieces of divided data including first divided data and second divided data by dividing image data corresponding to an entire printing-target image area in the conveyance direction;
    an image processing unit configured to create print data including first print data corresponding to the first divided data and second print data corresponding to the second divided data by performing image processing including inclination correction in accordance with an inclination of the nozzle row for the divided data; and
    a storage control unit configured to store the print data in a print data storage area,
    wherein the creation unit creates the first divided data and the second divided data by dividing the image data so that the first print data and the second data, having been created by performing the image processing including the inclination correction, partially overlap with each other in the conveyance direction, and
    wherein the creation unit, the image processing unit, and the storage control unit are implemented by at least one processor of the printing apparatus.

2. The printing apparatus according to claim 1, wherein the creation unit divides the image data so that positions in the conveyance direction are different and along a line in the first direction.

3. The printing apparatus according to claim 1, further comprising:
    an image data storage area storing the image data and a divided data storage area storing the divided data.

4. The printing apparatus according to claim 1, wherein the inclination correction is, in a case where an angle of the inclination is a predetermined acute angle measured in a clockwise direction from the first direction, processing to cause the print data to have the predetermined acute angle in a counterclockwise direction from the first direction.

5. The printing apparatus according to claim 1, wherein a length of an area necessary for the inclination correction is a fixed value in accordance with the inclination or a variable value, and
    wherein based on an area necessary for the inclination correction, an amount of the divided data is derived.

6. The printing apparatus according to claim 1, wherein the image processing includes smoothing that converts a pixel value by referring to an area in the vicinity of a target pixel, and
    wherein an amount of the divided data is derived based on an area necessary for the smoothing.

7. The printing apparatus according to claim 1, further comprising:
  an image data storage control unit configured to store the image data in an image data storage area; and
  a divided data storage control unit configured to sequentially transfer the pieces of divided data created by the creation unit and to store the pieces of divided data in a divided data storage area,
  wherein the second divided data transferred to the divided data storage area by the divided data storage control unit includes a part of the first divided data transferred before the second divided data, and
  wherein the part of the first divided data is a portion whose position in a horizontal direction after the inclination correction is equal to that of the second divided data in the print data storage area.

8. The printing apparatus according to claim 1, wherein a length γ of a divided image corresponding to an amount of the divided data is derived based on a length α of a position shift in the conveyance direction between nozzles on both ends of the nozzle row.

9. The printing apparatus according to claim 8, wherein the length γ of the divided image corresponding to the amount of the divided data is derived based on a height H of an original image.

10. The printing apparatus according to claim 9, wherein the length γ of the divided image corresponding to the amount of the divided data is derived based on a number N of divisions.

11. The printing apparatus according to claim 1, wherein a length γ of a divided image corresponding to an amount of the divided data is derived by expression (1) below

[Mathematical expression 1]

$$\gamma = \alpha + \beta \quad \text{expression (1)}$$

where α indicates a length of a position shift in the conveyance direction between nozzles on both ends of the nozzle row and β is derived by expression (2) below

[Mathematical expression 2]

$$\beta = (H+\alpha)/N \quad \text{expression (2)}$$

where H indicates a height of an original image and N indicates a number of divisions.

12. A control method of a printing apparatus, the printing apparatus comprising a line print head in which a plurality of nozzle rows including a plurality of nozzles ejecting ink is arrayed and which is extended along a first direction intersecting with a conveyance direction of a printing medium, each of the nozzle rows having an inclination with respect to the first direction, the control method comprising:
  a step of creating, by a creation unit, a plurality of pieces of divided data including first divided data and second divided data by dividing image data corresponding to an entire printing-target image area in the conveyance direction;
  a step of creating, by an image processing unit, print data including first print data corresponding to the first divided data and second print data corresponding to the second divided data by performing image processing including inclination correction in accordance with an inclination of the nozzle row for the divided data; and
  a step of storing, by a storage control unit, the print data in a print data storage area,
  wherein at the step of creating the divided data, the first divided data and the second divided data are created by dividing the image data so that the first print data and the second data, having been created by performing the image processing including the inclination correction, partially overlap with each other in the conveyance direction, and
  wherein the creation unit, the image processing unit, and the storage control unit are implemented by at least one processor of the printing apparatus.

13. The control method according to claim 12, wherein at the step of creating the print data, the image data is divided so that positions in the conveyance direction are different and along a line in the first direction.

14. The control method according to claim 12, wherein the printing apparatus further comprises an image data storage area storing the image data and a divided data storage area storing the divided data.

15. The control method according to claim 12, wherein the inclination correction is, in a case where an angle of the inclination is a predetermined acute angle measured in a clockwise direction from the first direction, processing to cause the print data to have the predetermined acute angle in a counterclockwise direction from the first direction.

16. The control method according to claim 12, wherein a length of an area necessary for the inclination correction is a fixed value in accordance with the inclination or a variable value, and
  wherein based on an area necessary for the inclination correction, an amount of the divided data is derived.

17. The control method according to claim 12, wherein a length γ of a divided image corresponding to an amount of the divided data is derived by expression (3) below

[Mathematical expression 3]

$$\gamma = \alpha + \beta \quad \text{expression (3)}$$

where α indicates a length of a position shift in the conveyance direction between nozzles on both ends of the nozzle row and β is derived by expression (4) below

[Mathematical expression 4]

$$\beta = (H+\alpha)/N \quad \text{expression (4)}$$

where H indicates a height of an original image and N indicates a number of divisions.

18. The control method according to claim 12, wherein the image processing includes smoothing that converts a pixel value by referring to an area in the vicinity of a target pixel, and
  wherein an amount of the divided data is derived based on an area necessary for the smoothing.

19. A non-transitory computer-readable storage medium storing a program for causing a computer to carry out a control method of a printing apparatus, the printing apparatus comprising a line print head in which a plurality of nozzle rows including a plurality of nozzles ejecting ink is arrayed and which is extended along a first direction intersecting with a conveyance direction of a printing medium, each of the nozzle rows having an inclination with respect to the first direction, the control method comprising:
  a step of creating, by a creation unit, a plurality of pieces of divided data including first divided data and second divided data by dividing image data corresponding to an entire printing-target image area in the conveyance direction;
  a step of creating, by an image processing unit, print data including first print data corresponding to the first divided data and second print data corresponding to the second divided data by performing image processing including inclination correction in accordance with an inclination of the nozzle row for the divided data; and a step of storing, by a storage control unit, the print data in a print data storage area, wherein at the step of creating the divided data, the first divided data and the second divided data are created by dividing the image data so that the first print data and the second data, having been created by performing the image processing including the inclination correction, partially overlap with each other in the conveyance direction, and wherein the creation unit, the image processing unit, and the storage control unit are implemented by at least one processor of the printing apparatus.

* * * * *